(12) United States Patent
Yoneyama

(10) Patent No.: US 12,464,101 B2
(45) Date of Patent: Nov. 4, 2025

(54) PROJECTION IMAGE ADJUSTMENT METHOD, INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Takuo Yoneyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 56 days.

(21) Appl. No.: 18/621,253

(22) Filed: Mar. 29, 2024

(65) Prior Publication Data

US 2024/0333894 A1 Oct. 3, 2024

(30) Foreign Application Priority Data

Mar. 30, 2023 (JP) ................................. 2023-054897

(51) Int. Cl.
*H04N 19/31* (2014.01)
*H04N 9/31* (2006.01)

(52) U.S. Cl.
CPC ......... *H04N 9/3185* (2013.01); *H04N 9/3147* (2013.01); *H04N 9/3194* (2013.01)

(58) Field of Classification Search
CPC ........................... H04N 9/3185; H04N 9/3147
USPC ......................................................... 348/135
See application file for complete search history.

(56) References Cited

U.S. PATENT DOCUMENTS

| | | | |
|---|---|---|---|
| 2002/0024640 A1 | 2/2002 | Ioka | |
| 2009/0147031 A1* | 6/2009 | Miyazawa | G03B 33/12 353/30 |
| 2011/0211065 A1 | 9/2011 | Furui | |

(Continued)

FOREIGN PATENT DOCUMENTS

| | | |
|---|---|---|
| JP | 2002-072359 A | 3/2002 |
| JP | 2011-182076 A | 9/2011 |
| JP | 2021-061510 A | 4/2021 |

(Continued)

OTHER PUBLICATIONS

Meiji University; Autocorrelation Method; Jun. 20, 2022; Published by Meiji University.

(Continued)

*Primary Examiner* — Jeffery A Williams
(74) *Attorney, Agent, or Firm* — Oliff PLC

(57) ABSTRACT

A projection image adjustment method includes acquiring a first captured image with a first image projected at a first position and a second image overlapping the first and projected at a second position, acquiring first and second amounts of shift based on the first image, moving the first image from the first to a third position in a first direction when the first and second shift amounts satisfy a first condition, acquiring a second captured image with the first image projected at the third position and the second image projected at the second position, acquiring third and fourth amounts of shift based on the second image, and moving the first image from the third to a fourth position in a second direction opposite of the first when the third and fourth amounts of shift satisfy a second condition and the third amount of shift is greater than the first.

10 Claims, 10 Drawing Sheets

(56) References Cited

U.S. PATENT DOCUMENTS

2021/0302810 A1  9/2021  Kinoshita

FOREIGN PATENT DOCUMENTS

| JP | 2021-114685 A | 8/2021 |
| JP | 2021-157056 A | 10/2021 |

OTHER PUBLICATIONS

Fourier Transform of Trigonometric Function; Jun. 20, 2022; Published by: ninjin&natsu.

* cited by examiner

| Ct | dx (mm) | nx | dy (mm) | ny | REMARKS |
|---|---|---|---|---|---|
| 1 | 1.8 | 1 | 0 | 0 | A, +X |
| 2 | 2.3 | 2 | 0 | 0 | A, -X |
| 3 | 1.8 | 3 | 0 | 0 | A, -X |
| 4 | 1.3 | 4 | 0 | 0 | A, -X |
| 5 | 0.8 | 5 | 0 | 0 | A, -X |
| 6 | 0.3 | 5 | 0 | 0 | - |

| Ct | dx (mm) | nx | dy (mm) | ny | REMARKS |
|---|---|---|---|---|---|
| 1 | 1.8 | 1 | 0 | 0 | A, +X |
| 2 | 1.3 | 2 | 0 | 0 | A, +X |
| 3 | 0.8 | 3 | 0 | 0 | A, +X |
| 4 | 0.3 | 3 | 0 | 0 | - |

FIG. 9
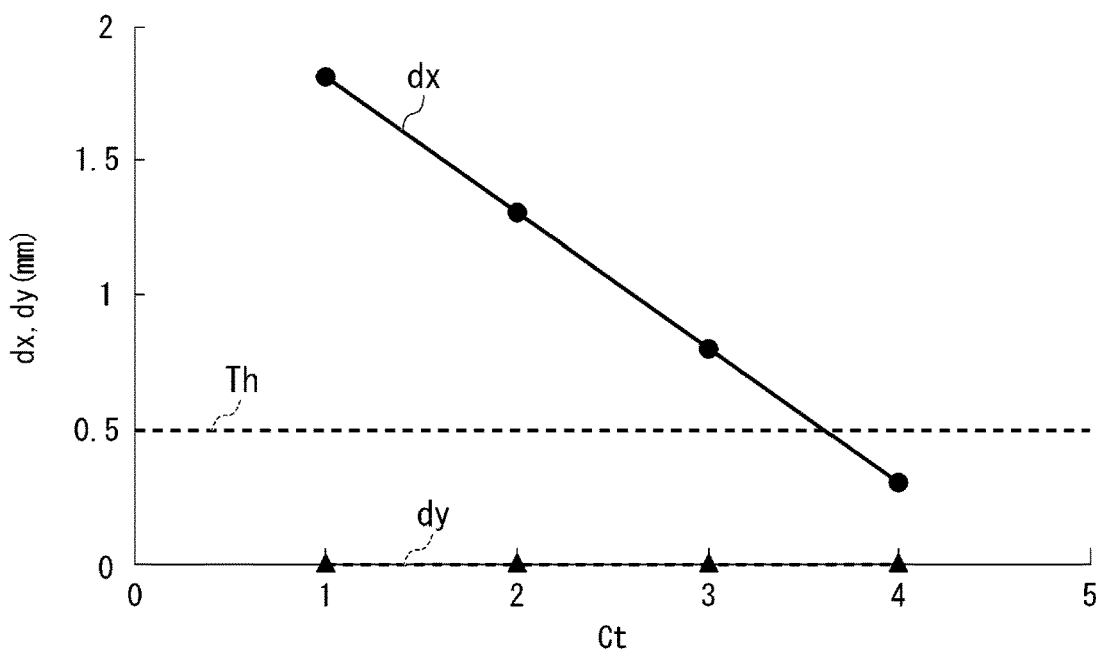
FIG. 10
| Ct | dx (mm) | nx | dy (mm) | ny | REMARKS |
|---|---|---|---|---|---|
| 1 | 0 | 0 | 0.8 | 1 | A, +Y |
| 2 | 0 | 0 | 1.3 | 2 | A, −Y |
| 3 | 0 | 0 | 0.8 | 3 | A, −Y |
| 4 | 0 | 0 | 0.3 | 4 | − |
FIG. 11
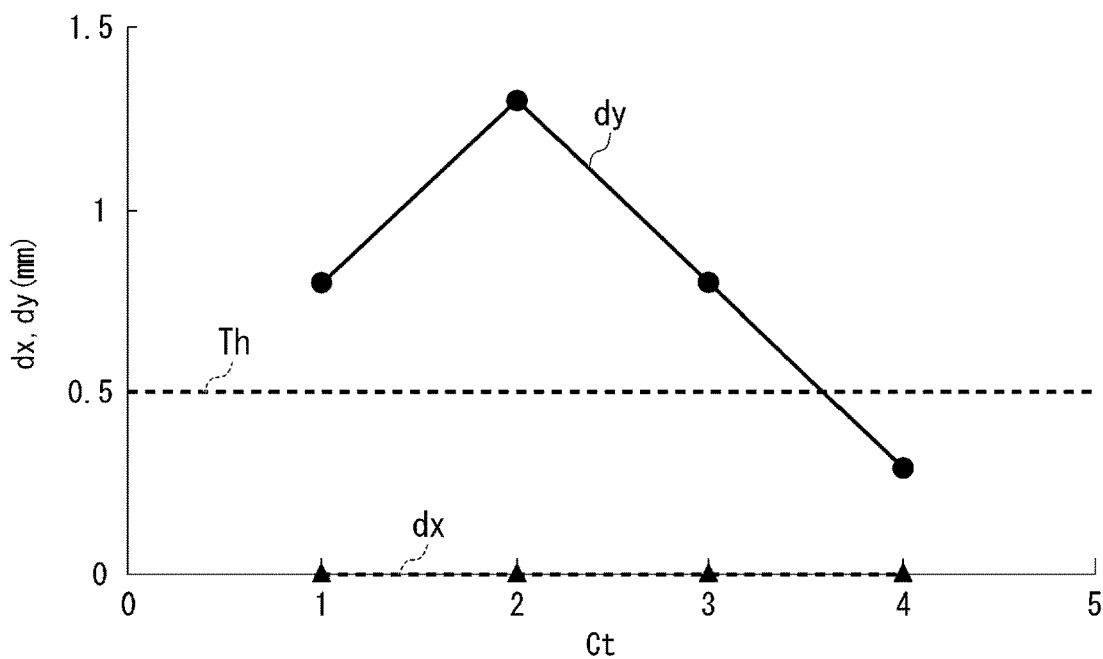

FIG. 12

| Ct | dx (mm) | nx | dy (mm) | ny | REMARKS |
|----|---------|----|---------|----|---------|
| 1  | 2.4     | 1  | 1.3     | 0  | A, +X   |
| 2  | 2.9     | 2  | 1.3     | 0  | A, −X   |
| 3  | 2.4     | 3  | 1.3     | 0  | A, −X   |
| 4  | 1.9     | 4  | 1.3     | 0  | A, −X   |
| 5  | 1.4     | 5  | 1.3     | 0  | A, −X   |
| 6  | 0.9     | 5  | 1.3     | 1  | A, +Y   |
| 7  | 0.9     | 5  | 1.8     | 2  | A, −Y   |
| 8  | 0.9     | 5  | 1.3     | 3  | A, −Y   |
| 9  | 0.9     | 6  | 0.8     | 3  | A, −X   |
| 10 | 0.4     | 6  | 0.8     | 4  | A, −Y   |
| 11 | 0.4     | 6  | 0.3     | 4  | −       |

PROJECTION IMAGE ADJUSTMENT METHOD, INFORMATION PROCESSING APPARATUS, AND NON-TRANSITORY COMPUTER-READABLE STORAGE MEDIUM STORING PROGRAM

The present application is based on, and claims priority from JP Application Serial Number 2023-054897, filed Mar. 30, 2023, the disclosure of which is hereby incorporated by reference herein in its entirety.

BACKGROUND

1. Technical Field

The present disclosure relates to a projection image adjustment method, a projection system, an information processing apparatus, and a non-transitory computer-readable storage medium storing a program.

2. Related Art

JP-A-2021-061510 discloses a technology for detecting the amount and direction of pixel shift between a plurality of projection images projected by the plurality of projectors to overlap with each other. The technology includes capturing overlapping regions where a plurality of projection images overlap with each other to acquire captured images, applying two-dimensional Fourier transform to the captured images to produce frequency spectrum images, and detecting the amount and direction of pixel shift based on the frequency spectrum images.

JP-A-2021-061510 is an example of the related art.

The technology disclosed in JP-A-2021-061510 can detect the amount and direction of the relative pixel shift between the plurality of projection images, but cannot determine which projection image is shifted in which direction. In other words, the technology disclosed in JP-A-2021-061510 cannot detect the absolute pixel shift direction in each of the projection images. Furthermore, JP-A-2021-061510 does not specifically describe how to correct the pixel shift between the plurality of projection images only with the aid of the known amount and direction of the relative pixel shift. It is therefore difficult to correct the pixel shift between the plurality of projection images overlapping with each other based on the technical content disclosed in JP-A-2021-061510.

SUMMARY

A projection image adjustment method according to an aspect of the present disclosure includes acquiring a first captured image from a camera by causing the camera to capture an image of a projection surface with a first image projected by a first projector at a first position on the projection surface and a second image projected by a second projector at a second position on the projection surface and at least partially overlapping with the first image, acquiring, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causing the first projector to move the first image from the first position to a third position separate therefrom by a first distance in a first direction corresponding to a direction toward one end of the first axis when the first and second amounts of shift satisfy a first condition, acquiring a second captured image from the camera by causing the camera to capture an image of the projection surface with the first image projected by the first projector at the third position and the second image projected by the second projector at the second position, acquiring, based on the second captured image, a third amount of shift along the first axis between the first image and the second image and a fourth amount of shift along the second axis between the first image and the second image, and causing the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

A projection system according to another aspect of the present disclosure includes a first projector that projects a first image onto a projection surface, a second projector that projects a second image onto the projection surface, and a camera that captures an image of the projection surface, the first projector including a processing apparatus that acquires a first captured image from the camera by causing the camera to capture an image of the projection surface with the first image projected by the first projector at a first position on the projection surface and the second image projected by the second projector at a second position on the projection surface and at least partially overlapping with the first image, acquires, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causes the first projector to move the first image from the first position to a third position separate therefrom by a first distance in a first direction corresponding to a direction toward one end of the first axis when the first and second amounts of shift satisfy a first condition, acquires a second captured image from the camera by causing the camera to capture an image of the projection surface with the first image projected by the first projector at the third position and the second image projected by the second projector at the second position, acquires, based on the second captured image, a third amount of shift along the first axis between the first image and the second image and a fourth amount of shift along the second axis between the first image and the second image, and causes the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

An information processing apparatus according to another aspect of the present disclosure includes a processing apparatus that acquires a first captured image from a camera by causing the camera to capture an image of a projection surface with a first image projected by a first projector at a first position on the projection surface and a second image projected by a second projector at a second position on the projection surface and at least partially overlapping with the first image, acquires, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causes the first projector to move the first image from the first position to a third position separate therefrom by a first distance in a first direction corresponding to a direction toward one end of the first axis when the first and second amounts of shift satisfy a first condition, acquires a second captured image from the camera by causing the camera to capture an image of the projection surface with the first image projected by the first projector at the third position and the second image projected by the second projector at the second position, acquires, based on the second captured image, a third amount of shift along the first axis between the first image and the second image and a fourth amount of shift along the second axis between the first image and the second image, and causes the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

A non-transitory computer-readable storage medium storing a program according to an aspect of the present disclosure causes a computer to acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, and a second amount of shift along a second axis between the first image and the second image, the second axis being perpendicular the first axis, cause the first projector to move the first image from the first position to a third position separate therefrom by a first distance in a first direction corresponding to a direction toward one end of the first axis when the first and second amounts of shift satisfy a first condition, acquire a second captured image from the camera by causing the camera to capture an image of the projection surface with the first image projected by the first projector at the third position and the second image projected by the second projector at the second position, acquire, based on the second captured image, a third amount of shift along the first axis between the first image and the second image and a fourth amount of shift along the second axis between the first image and the second image, and cause the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

BRIEF DESCRIPTION OF THE DRAWINGS

FIG. 9 is a graph showing the second action example.

FIG. 10 is a table showing a third action example of the projection system.

FIG. 11 is a graph showing the third action example.

FIG. 12 is a table showing a fourth action example of the projection system.

DESCRIPTION OF EMBODIMENTS

Embodiments of the present disclosure will be described below with reference to the drawings. In the figures below, the scale of each member differs in some cases from the actual value to make the member large enough to be recognizable.

First Embodiment

Figure 1:
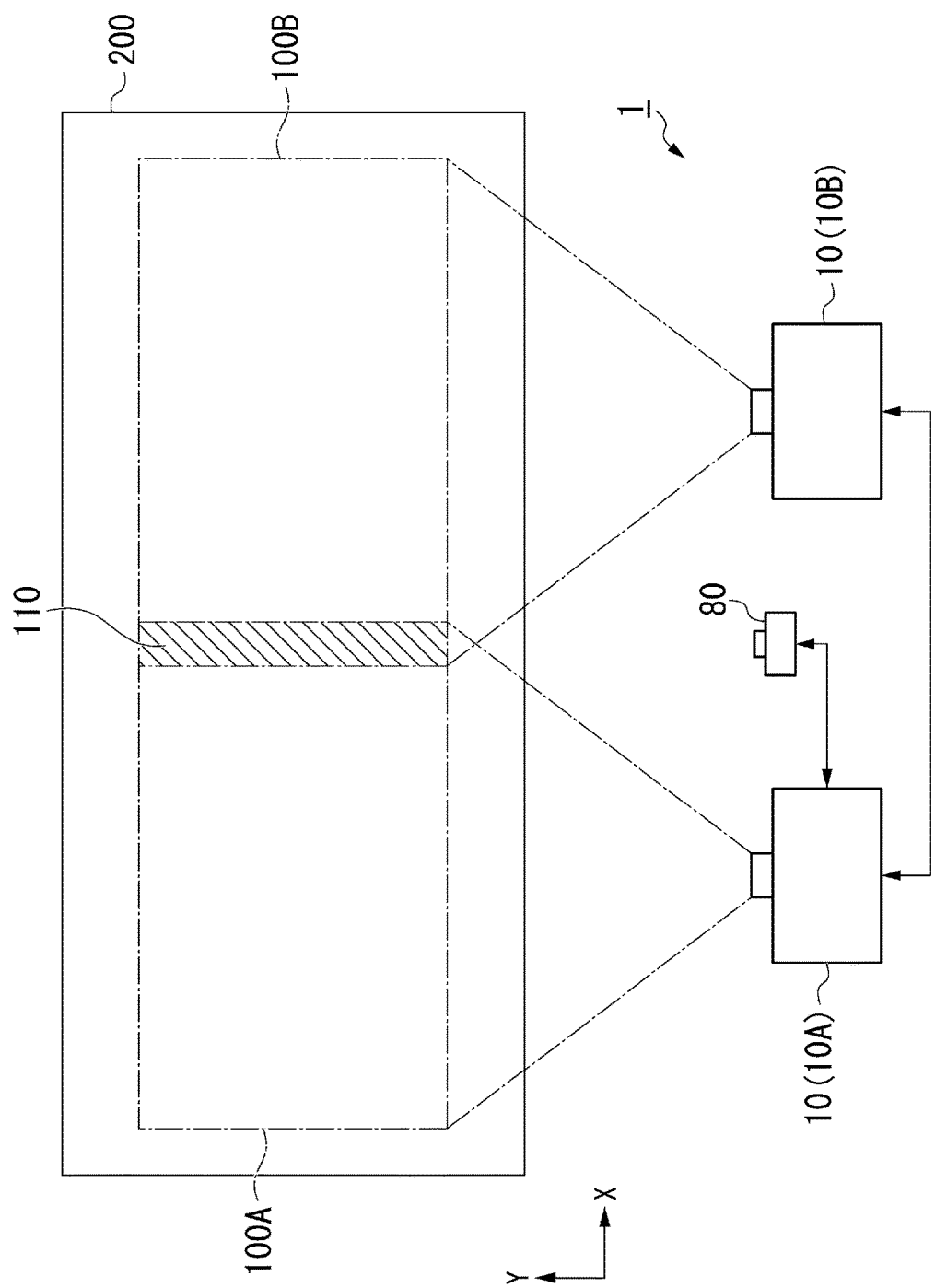
FIG. 1 shows a schematic configuration of a projection system according to a first embodiment.

A first embodiment of the present disclosure will be described below. FIG. 1 shows a schematic configuration of a projection system 1 according to the first embodiment. The projection system 1 is a multi-projection system that displays a single image on a projection 200 by tiling a plurality of images projected from a plurality of projectors 10 onto a projection surface 200. The projection surface 200 may be a dedicated projection screen, or a surface of an object such as a wall surface.

As an example, the projection system 1 includes two projectors 10 and a camera 80. In the following description, one of the projectors 10 may be referred to as a "first projector 10A", and the other projector 10 may be referred to as a "second projector 10B". The first projector 10A projects a first image 100A on the projection surface 200. The second projector 10B projects a second image 100B on the projection surface 200.

The first projector 10A projects the first image 100A at a first position on the projection surface 200. The second projector 10B projects the second image 100B, at least part of which overlaps with the first image 100A, at a second position on the projection surface 200. For example, the center position of the first image 100A coincides with the first position, and the center position of the second image 100B coincides with the second position. In the following description, a region 110, where the first image 100A and the second image 100B overlap with each other, is referred in some cases to as an "overlapping region 110".

The first projector 10A communicates with the second projector 10B. The communication between the first projector 10A and the second projector 10B may be wired or wireless communication. For example, short-range wireless communication such as Bluetooth (registered trademark) may be employed as the wireless communication.

The camera 80 captures an image of the projection surface 200. The camera 80 does not need to capture an image of the entire projection surface 200, and only needs to capture an image of a region containing at least the overlapping region 110. In other words, at least the overlapping region 110 only needs to fall within the angle of view of the camera 80. For example, the camera 80 is coupled to the first projector 10A via a communication cable such as a universal serial bus (USB) cable.

The camera 80 captures an image of the projection surface 200 in response to an image capture request signal transmitted from the first projector 10A to the camera 80, and outputs captured image data representing the captured image of the projection surface 200 to the first projector 10A. The camera 80 may be disposed at a position separate from the first projector 10A or may be attached to the enclosure of the first projector 10A. The camera 80 may instead be disposed in the enclosure of the first projector 10A. That is, the first projectors 10A may include the camera 80.

FIG. 1 additionally shows an X-axis and a Y-axis perpendicular to the X-axis as the coordinate axes of a global coordinate system. The X-axis is an axis parallel to the horizontal sides of a rectangular projection region containing the first image 100A and the second image 100B, and the Y-axis is an axis parallel to the vertical sides of the projection region. The direction that the arrow on each of the axes points toward is the direction toward the positive end thereof, and the opposite direction of the direction toward the positive end thereof is the direction toward the negative end thereof. It is assumed in the following description that an image coordinate system of the camera 80, that is, the coordinate system of the captured image produced by the camera 80, and a unique local coordinate system of each of the projectors 10 coincide with the global coordinate system.

Figure 2:
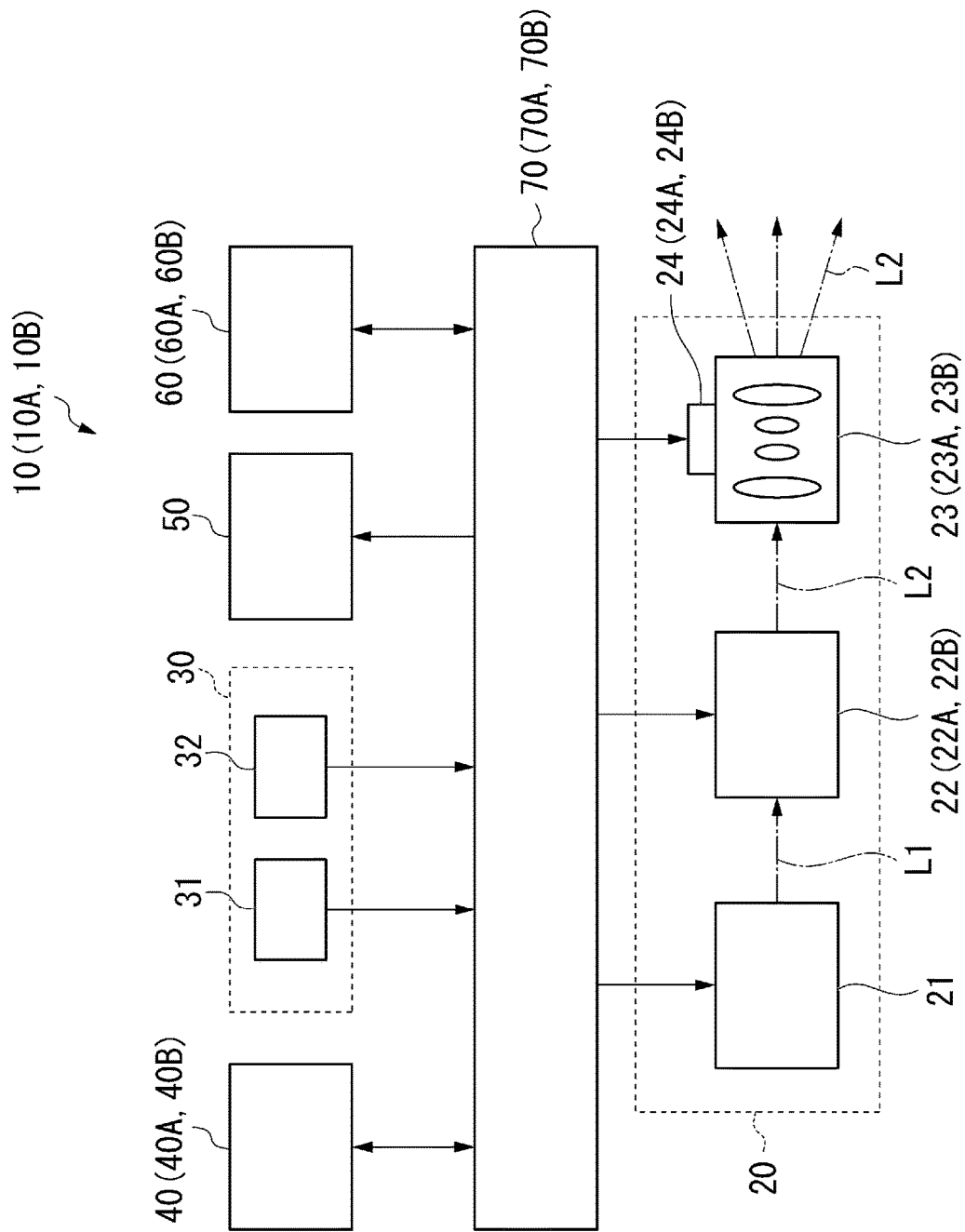
FIG. 2 is a block diagram showing a schematic configuration of a projector.

FIG. 2 is a block diagram showing a schematic configuration of each of the projectors 10. The projector 10 includes an optical apparatus 20, an input apparatus 30, a communication apparatus 40, a loudspeaker 50, a memory 60, and a processing apparatus 70.

The optical apparatus 20 includes a light source 21, a liquid crystal panel 22, a projection lens 23, and an actuator 24. The light source 21 outputs white light L1 to the liquid crystal panel 22. For example, the light source 21 is a mercury lamp, a xenon lamp, an LED (light emitting diode), or a laser light source. The amount of white light L1 output from the light source 21 is controlled by the processing apparatus 70.

The liquid crystal panel 22 is, for example, an actively driven liquid crystal panel including thin film transistors (TFTs) as pixel switching devices on a pixel basis. The light transmittance of each pixel of the liquid crystal panel 22 is controlled by the processing apparatus 70. As a result, the liquid crystal panel 22 functions as a light modulator. The liquid crystal panel 22 modulates the white light L1 incident from the light source 21 to output image light L2, which is the mixture of red light, green light, and blue light, to the projection lens 23. Note that the optical apparatus 20 may have a configuration including one or more liquid crystal panels or one or more digital mirror devices (DMDs).

An image coordinate system of the liquid crystal panel 22, that is, a panel image coordinate system coincides with the local coordinate system of the projector 10. In the present embodiment, in which the local coordinate system of the projector 10 is assumed to coincide with the global coordinate system as described above, the panel image coordinate system also coincides with the global coordinate system.

In the following description, the liquid crystal panel 22 provided in the first projector 10A may be referred to as a "first liquid crystal panel 22A", and the liquid crystal panel 22 provided in the second projector 10B may be referred to as a "second liquid crystal panel 22B".

The first image 100A projected onto the projection surface 200 corresponds to a first panel image displayed in the display region of the first liquid crystal panel 22A provided in the first projector 10A. The second image 100B projected onto the projection surface 200 corresponds to a second panel image displayed in the display region of the second liquid crystal panel 22B provided in the second projector 10B.

The projection lens 23 includes a plurality of lenses, enlarges the image light L2 incident from the liquid crystal panel 22, and projects the enlarged image light L2 onto the projection surface 200. When the projector 10 in question is the first projector 10A, the image light L2 projected from the projection lens 23 onto the projection surface 200 corresponds to the first image 100A. When the projector 10 in question is the second projector 10B, the image light L2 projected from the projection lens 23 onto the projection surface 200 corresponds to the second image 100B.

In the following description, the projection lens 23 provided in the first projector 10A may be referred to as a "first projection lens 23A", and the projection lens 23 provided in the second projector 10B may be referred to as a "second projection lens 23B".

The actuator 24 adjusts the position of the projection lens 23 in the local coordinate system of the corresponding projector 10. In the present embodiment, in which the local coordinate system of the projector 10 is assumed to coincide with the global coordinate system as described above, the projection lens 23 is movable along each of two axes including the X-axis and the Y-axis. For example, the actuator 24 includes a motor, an apparatus that converts the rotational motion of the motor into biaxial linear motion of the projection lens 23, and other components. The action of the actuator 24 is controlled by the processing apparatus 70.

In the following description, the actuator 24 provided in the first projector 10A may be referred to as a "first actuator 24A", and the actuator 24 provided in the second projector 10B may be referred to as a "second actuator 24B".

The first actuator 24A adjusts the position of the first projection lens 23A to adjust the position where the first image 100A is projected, focusing, zooming, and other types of operation. That is, the position of the first image 100A projected onto the projection surface 200 changes in accordance with the position of the first projection lens 23A provided in the first projector 10A.

The second actuator 24B adjusts the position of the second projection lens 23B to adjust the position where the second image 100B is projected, focusing, zooming, and other types of operation. That is, the position of the second image 100B projected onto the projection surface 200 changes in accordance with the position of the second projection lens 23B provided in the second projector 10B.

The input apparatus 30 is an apparatus that accepts a user's input operation performed on the corresponding projector 10. As an example, the input apparatus 30 includes an operation panel 31 and a light receiver 32. The operation panel 31 is formed of a plurality of operation keys provided as part of the projector 10. For example, the operation keys include a power key, a menu activation key, a direction key, a finalizing key, and a volume adjustment key. The operation keys may be hardware keys, or software keys displayed on a touch panel provided as part of the projector 10. The operation panel 31 outputs an electric signal generated by the user operating any of the operation keys to the processing apparatus 70 as an operation signal.

The light receiver 32 includes a photoelectric conversion circuit that receives infrared light transmitted from a remote control (not shown) associated with the projector 10 and converts the infrared light into an electric signal. The light receiver 32 outputs the electric signal generated by the photoelectric conversion of the infrared light to the processing apparatus 70 as a remote operation signal. The remote control is provided with a plurality of operation keys, as the operation panel 31 is. The remote control converts an electric signal produced when the user operates any of the operation keys provided as part of the remote control into infrared light and transmits the infrared light to the projector 10. That is, the remote operation signal output from the light receiver 32 is substantially the same as the electric signal generated when the user operates any of the operation keys of the remote control. When the remote control transmits a radio signal in accordance with a short-range wireless communication standard, such as Bluetooth (registered trademark), a receiver that receives the radio signal may be provided in place of the light receiver 32.

The communication apparatus 40 relays communication between the processing apparatus 70 and an external apparatus. When the projector 10 in question is the first projector 10A, the communication apparatus 40 relays communication between the external apparatus, such as the second projector 10B and the camera 80, and the processing apparatus 70. When the projector 10 in question is the second projector 10B, the communication apparatus 40 relays communication between the external apparatus, such as the first projector 10A, and the processing apparatus 70.

In the following description, the communication apparatus 40 provided in the first projector 10A may be referred to as a "first communication apparatus 40A", and the communication apparatus 40 provided in the second projector 10B may be referred to as a "second communication apparatus 40B".

The loudspeaker 50 outputs audio having predetermined volume under the control of the processing apparatus 70.

The memory 60 includes a nonvolatile memory that stores a program and a variety of setting data necessary for the processing apparatus 70 to carry out a variety of processes, and a volatile memory used as a temporary data saving destination when the processing apparatus 70 carries out the variety of processes. The nonvolatile memory is, for example, an EEPROM (electrically erasable programmable read-only memory), a ROM (read only memory), or a flash memory. The volatile memory is, for example, a RAM (random access memory).

In the following description, the memory 60 provided in the first projector 10A may be referred to as a "first memory 60A", and the memory 60 provided in the second projector 10B may be referred to as a "second memory 60B".

The processing apparatus 70 is a processor that carries out the variety of processes in accordance with the program stored in advance in the memory 60. The processing apparatus 70 is formed of one or more CPUs (central processing units) by way of example. Part or entirety of the functions of the processing apparatus 70 may be achieved, for example, by a DSP (digital signal processor), an ASIC (application specific integrated circuit), a PLD (programmable logic device), or an FPGA (field programmable gate array). The processing apparatus 70 concurrently or successively carries out the variety of processes.

In the following description, the processing apparatus 70 provided in the first projector 10A may be referred to as a "first processing apparatus 70A", and the processing apparatus 70 provided in the second projector 10B may be referred to as a "second processing apparatus 70B".

Although will be described later in detail, the first processing apparatus 70A of the first projector 10A performs pixel shift correction in accordance with the program stored in advance in the first memory 60A. The pixel shift correction is the process of correcting a pixel shift between the first image 100A and the second image 100B in the overlapping region 110.

Figure 3:
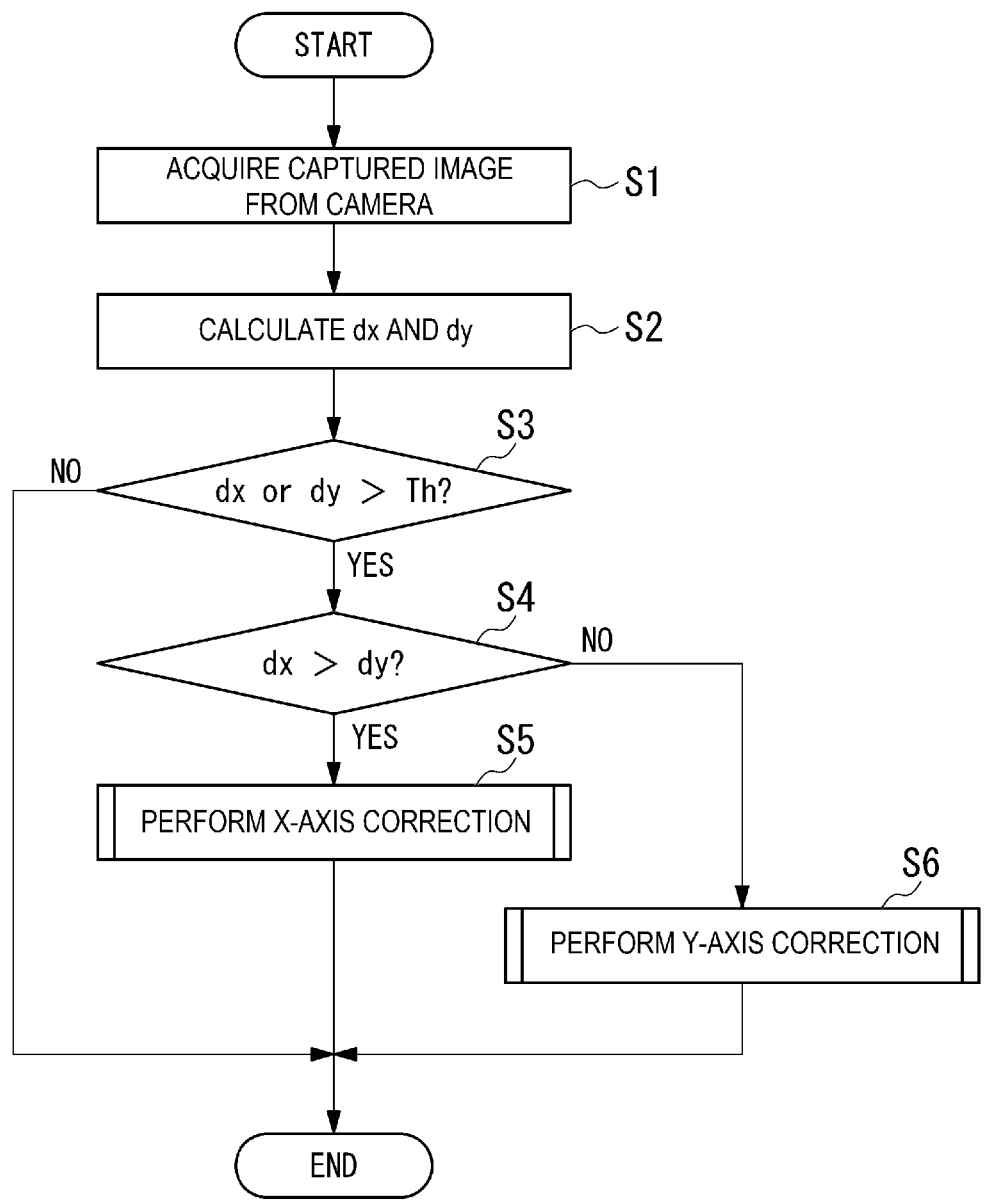
FIG. 3 is a flowchart showing pixel shift correction.

FIG. 3 is a flowchart showing the pixel shift correction performed by the first processing apparatus 70A of the first projector 10A. The first processing apparatus 70A reads the program from the first memory 60A and executes the program to perform, the pixel shift correction shown in FIG. 3. The first processing apparatus 70A repeatedly performs the pixel shift correction at predetermined time intervals.

The first processing apparatus 70A acquires a captured image of the projection surface 200 from the camera 80 (step S1). Specifically, the first processing apparatus 70A transmits the image capture request signal to the camera 80 via the first communication apparatus 40A. The camera 80 captures an image of the projection surface 200 in response to the image capture request signal, and outputs captured image data representing the captured image of the projection surface 200 to the first projector 10A. That is, in step S1, the first processing apparatus 70A receives the captured image data, which represents the captured image of the projection surface 200, from the camera 80. The captured image includes at least an image corresponding to the overlapping region 110.

The first processing apparatus 70A subsequently calculates the amount and direction of the relative pixel shift between the first image 100A and the second image 100B in the overlapping region 110 based on the captured image (step S2). In the following description, the amount of pixel shift along the X-axis between the first image 100A and the second image 100B is referred to as "the amount of X-axis shift dx", and the amount of pixel shift along the Y-axis between the first image 100A and the second image 100B is referred to as "the amount of Y-axis shift dy". That is, in step S2, the first processing apparatus 70A calculates the amount of X-axis shift dx and the amount of Y-axis shift dy in the overlapping region 110 based on the captured image. The first processing apparatus 70A temporarily saves the amount of X-axis shift dx and the amount of Y-axis shift dy in the first memory 60A.

A method for calculating the amount and direction of the relative pixel shift is not limited to a specific method. For example, the method disclosed in JP-A-2021-061510 is applicable as the method for calculating the amount and direction of the relative pixel shift. Therefore, see JP-A-2021-061510 for the specific calculation method. Any other known technology may be applied as the method for calculating the amount and direction of the relative pixel shift. For example, based on the captured image, feature points contained in each of the first image 100A and the second image 100B may be extracted, and the amount of X-axis shift dx and the amount of Y-axis shift dy may be calculated based on the distance between the feature points and the direction in which the feature points are arranged.

The first processing apparatus 70A subsequently evaluates whether the amount of X-axis shift dx or the amount of Y-axis shift dy is greater than a threshold Th (step S3). For example, the threshold Th is equal to the lower limit of the amount of pixel shift that can be calculated from the captured image. When the amount of X-axis shift dx or the amount of Y-axis shift dy is greater than the threshold Th (Yes in step S3), the first processing apparatus 70A transitions to step S4. On the other hand, when the amount of X-axis shift dx and the amount of Y-axis shift dy are both smaller than the threshold Th (No in step S3), the first processing apparatus 70A deletes the amount of X-axis shift dx and the amount of Y-axis shift dy temporarily saved in the first memory 60A and then terminates the pixel shift correction.

Upon the transition to step S4, the first processing apparatus 70A evaluates whether the amount of X-axis shift dx is greater than the amount of Y-axis shift dy (step S4). When the amount of X-axis shift dx is greater than the amount of Y-axis shift dy (Yes in step S4), the first processing apparatus 70A performs X-axis correction (step S5). On the other hand, when the amount of X-axis shift dx is smaller than the amount of Y-axis shift dy (No in step S4), the first processing apparatus 70A performs Y-axis correction (step S6). When the amount of X-shift dx is equal to the amount of Y-axis shift dy in the evaluation, the correction to be performed may not be specifically selected, that is, the X-axis correction or the Y-axis correction may be performed.

Figure 4:
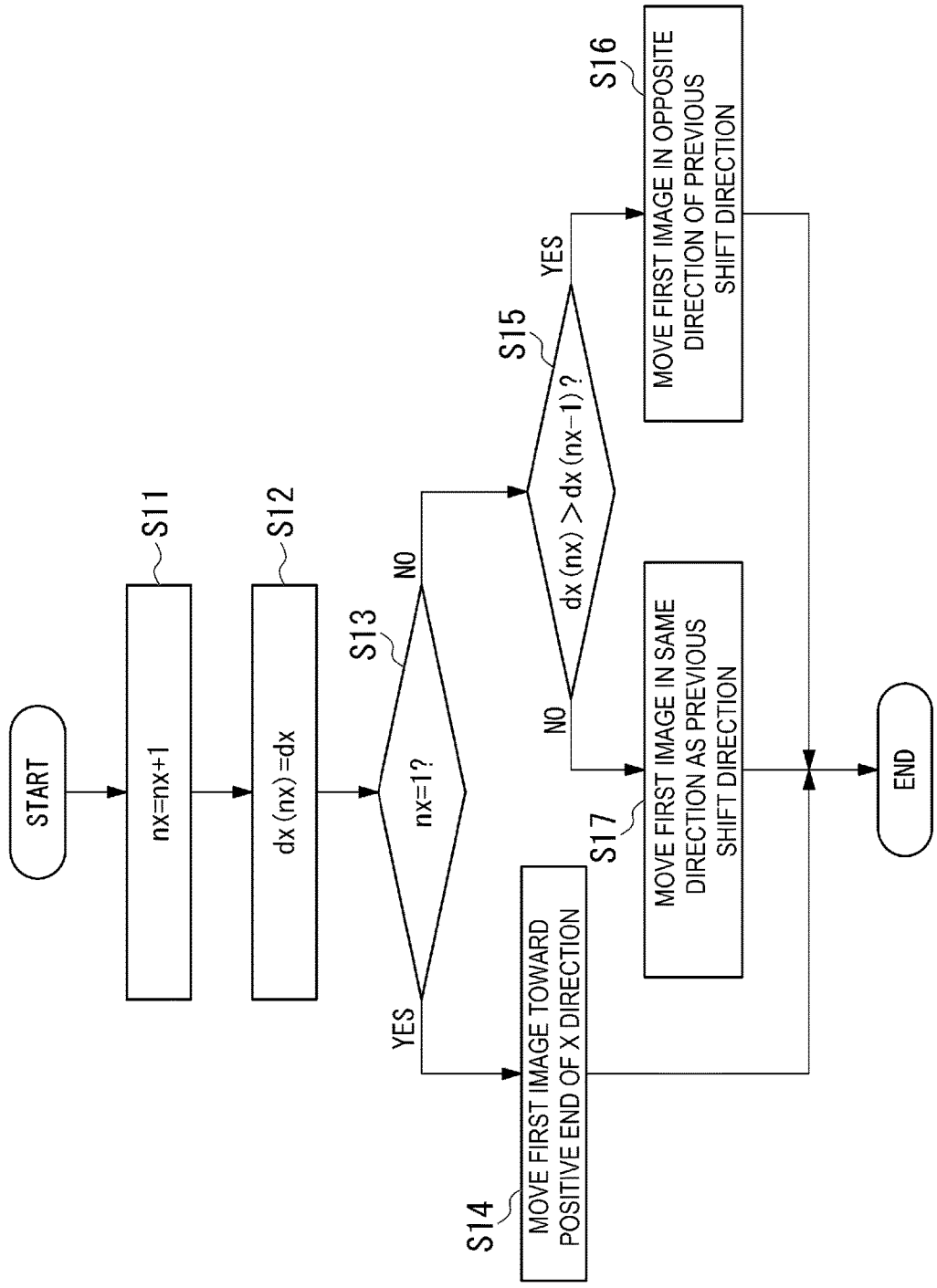
FIG. 4 is a flowchart showing X-axis correction.

FIG. 4 is a flowchart showing the X-axis correction performed by the first processing apparatus 70A. Upon the start of the X-axis correction, the first processing apparatus 70A first increments the value of a first count variable nx (step S11). The first count variable nx is a variable representing the number of times the X-axis correction has been performed. Note that the value of the first count variable nx is reset to "0" in advance before the X-axis correction is performed for the first time.

The first processing apparatus 70A subsequently links the amount of X-axis shift dx temporarily saved in the first memory 60A with the value of the first count variable nx and saves the result in the first memory 60A (step S12). In the following description, for example, dx(nx) represents the amount of X-axis shift dx saved when the X-axis correction is performed for the nx-th time.

The first processing apparatus 70A subsequently evaluates whether the value of the first count variable nx is "1" (step S13). In other words, the first processing apparatus 70A evaluates in step S13 whether the current X-axis correction is the first X-axis correction. When the value of the first count variable nx is "1" (Yes in step S13), first processing apparatus 70A transitions to step S14. On the other hand, when the value of the first count variable nx is not "1" (No in step S13), the first processing apparatus 70A transitions to step S15.

Upon the transition to step S14, the first processing apparatus 70A moves the first image 100A by a unit amount of displacement toward the positive end of X direction (step S14). For example, the unit amount of displacement is set at a value greater than or equal to the lower limit of the amount of pixel shift that can be calculated from the captured image. The reason for this is that when the unit amount of displacement is set at a value smaller than the lower limit of the amount of pixel shift that can be calculated from the captured image, the fact that the first image 100A has been moved cannot be recognized from the captured image.

As already described above, the position of the first image 100A projected onto the projection surface 200 changes in accordance with the position of the first projection lens 23A provided in the first projector 10A. The first processing apparatus 70A may therefore move the first image 100A in step S14 by the unit amount of displacement toward the positive end of the X direction by changing the position of the first projection lens 23A with the first actuator 24A.

The first image 100A projected onto the projection surface 200 corresponds to the first panel image displayed in the display region of the first liquid crystal panel 22A provided in the first projector 10A. The first processing apparatus 70A may therefore move the first image 100A by the unit amount of displacement toward the positive end of the X direction in step S14 by changing the position where the first panel image is displayed in the display region of the first liquid crystal panel 22A.

In the following description, when the process of moving the first image 100A along the X-axis takes place, the first image 100A is moved in the same manner as in step S14. After executing step S14, the first processing apparatus 70A terminates the X-axis correction and also terminates the pixel shift correction.

Upon the transition to step S15, the first processing apparatus 70A evaluates whether Conditional Expression (1) below is satisfied (step S15). In Conditional Expression (1) below, dx(nx) represents the amount of X-axis shift dx saved when the nx-th X-axis correction is performed, and dx(nx−1) represents the amount of X-axis shift dx saved when the (nx−1)-th X-axis correction is performed. In other words, dx(nx) represents the current value of the amount of X-axis shift dx, and dx(nx−1) represents the previous value of the amount of X-axis shift dx.

$$dx(nx) > dx(nx-1) \tag{1}$$

The first processing apparatus 70A transitions to step S16 when Conditional Expression (1) is satisfied (Yes in step S15), that is, when the current value of the amount of X-axis shift dx is greater than the previous value of the amount of X-axis shift dx. On the other hand, the first processing apparatus 70A transitions to step S17 when Conditional Expression (1) is not satisfied (No in step S15), that is, when the current value of the amount of X-axis shift dx is smaller than the previous value of the amount of X-axis shift dx.

Upon the transition to step S16, the first processing apparatus 70A moves the first image 100A by the unit amount of displacement in the opposite direction of the previous shift direction (step S16). The previous shift direction is the direction in which the first image 100A was moved when the previous X-axis correction was performed. After executing the first step S16, processing apparatus 70A terminates the X-axis correction and also terminates the pixel shift correction.

On the other hand, upon the transition to step S17, the first processing apparatus 70A moves the first image 100A by the unit amount of displacement in the same direction as the previous shift direction (step S17). After executing step S17, the first processing apparatus 70A terminates the X-axis correction and also terminates the pixel shift correction.

Figure 5:
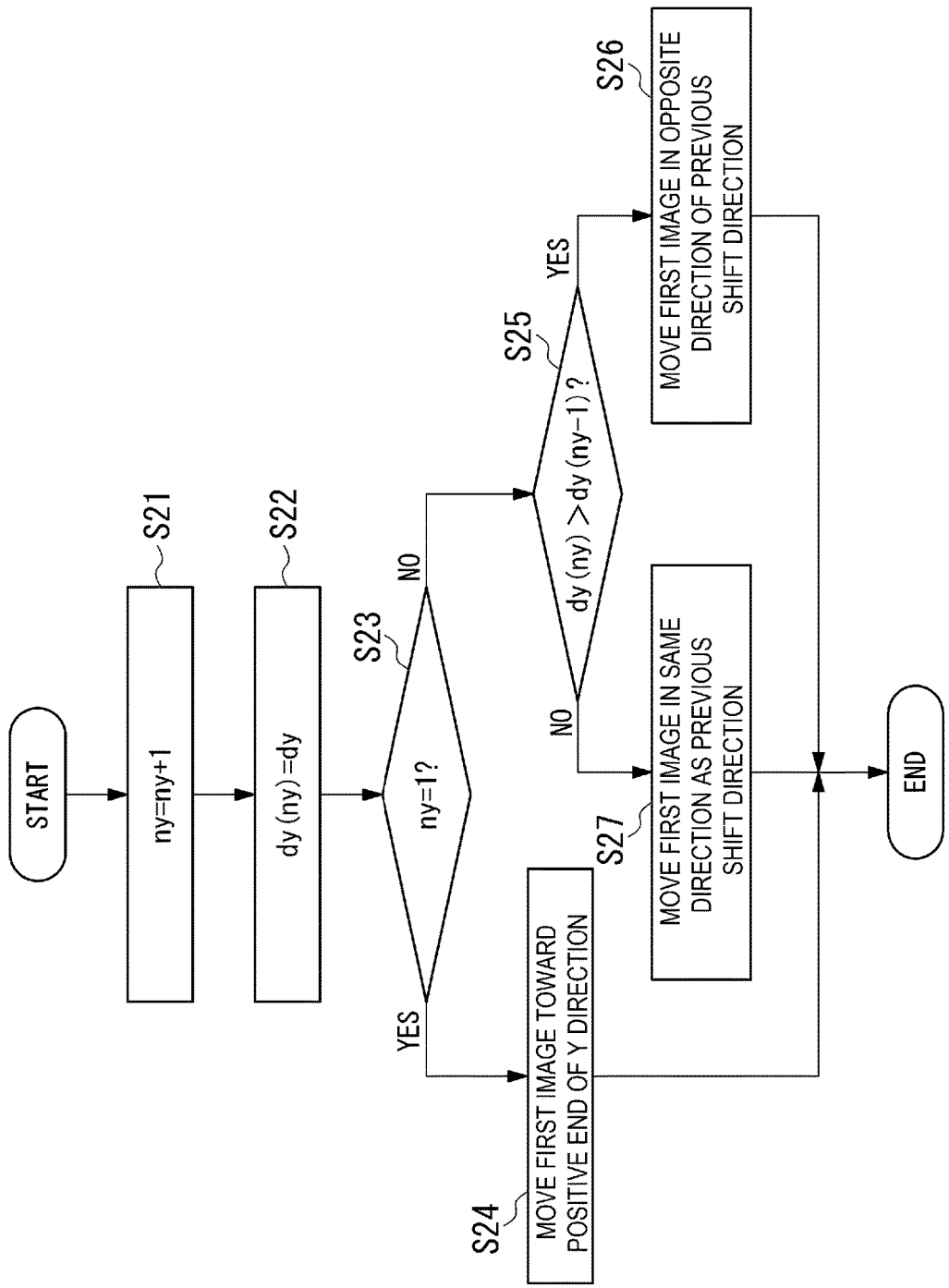
FIG. 5 is a flowchart showing Y-axis correction.

FIG. 5 is a flowchart showing the Y-axis correction performed by the first processing apparatus 70A. Upon the start of the Y-axis correction, the first processing apparatus 70A first increments the value of a second count variable ny (step S21). The second count variable ny is a variable representing the number of times the Y-axis correction has been performed. Note that the value of the second count variable ny is reset to "0" in advance before the Y-axis correction is performed for the first time.

The first processing apparatus 70A subsequently links the amount of Y-axis shift dy temporarily saved in the first memory 60A with the value of the second count variable ny and saves the result in the first memory 60A (step S22). In the following description, for example, dy(ny) represents the amount of Y-axis shift dy saved when the Y-axis correction is performed for the ny-th time.

The first processing apparatus 70A subsequently evaluates whether the value of the second count variable ny is "1" (step S23). In other words, in step S23, the first processing apparatus 70A evaluates whether the current Y-axis correction is the first Y-axis correction. When the value of the second count variable ny is "1" (Yes in step S23), the first processing apparatus 70A transitions to step S24. On the other hand, when the value of the second count variable ny is not "1" (No in step S23), the first processing apparatus 70A transitions to step S25.

Upon the transition to step S24, the first processing apparatus 70A moves the first image 100A by the unit amount of displacement toward the positive end of Y direction (step S24). In step S24, the first processing apparatus 70A may move the first image 100A by the unit amount of displacement toward the positive end of the Y direction by changing the position of the first projection lens 23A with the first actuator 24A. Instead, in step S24, the first processing apparatus 70A may move the first image 100A by the unit amount of displacement toward the positive end of the Y direction by changing the position where the first panel image is displayed in the display region of the first liquid crystal panel 22A.

In the following description, when the process of moving the first image 100A along the Y-axis takes place, the first image 100A is moved in the same manner as in step S24. After executing step S24, the first processing apparatus 70A terminates the Y-axis correction and also terminates the pixel shift correction.

Upon the transition to step S25, the first processing apparatus 70A evaluates whether Conditional Expression (2) below is satisfied (step S25). In Conditional Expression (2) below, dy(ny) represents the amount of Y-axis shift dy saved when the ny-th Y-axis correction is performed, and dy(ny−1) represents the amount of Y-axis shift dy saved when the (ny−1)-th Y-axis correction is performed. In other words, dy(ny) represents the current value of the amount of Y-axis shift dy, and dy(ny−1) represents the previous value of the amount of Y-axis shift dy.

$$dy(ny) > dy(ny - 1) \quad (2)$$

The first processing apparatus 70A transitions to step S26 when Conditional Expression (2) is satisfied (Yes in step S25), that is, when the current value of the amount of Y-axis shift dy is greater than the previous value of the amount of Y-axis shift dy. On the other hand, the first processing apparatus 70A transitions to step S27 when Conditional Expression (2) is not satisfied (No in step S25), that is, when the current value of the amount of Y-axis shift dy is smaller than the previous value of the amount of Y-axis shift dy.

Upon the transition to step S26, the first processing apparatus 70A moves the first image 100A by the unit amount of displacement in the opposite direction of the previous shift direction (step S26). The previous shift direction is the direction in which the first image 100A was moved when the previous Y-axis correction was performed. After executing step S26, the first processing apparatus 70A terminates the Y-axis correction and also terminates the pixel shift correction.

On the other hand, upon the transition to step S27, the first processing apparatus 70A moves the first image 100A by the unit amount of displacement in the same direction as the previous shift direction (step S27). After executing step S27, the first processing apparatus 70A terminates the Y-axis correction and also terminates the pixel shift correction.

The pixel shift correction has been described above. On the premise of the pixel shift correction described above, an example of the action of the projection system 1 will be specifically described below.

1. First Action Example

Figures 6, 7, 8:
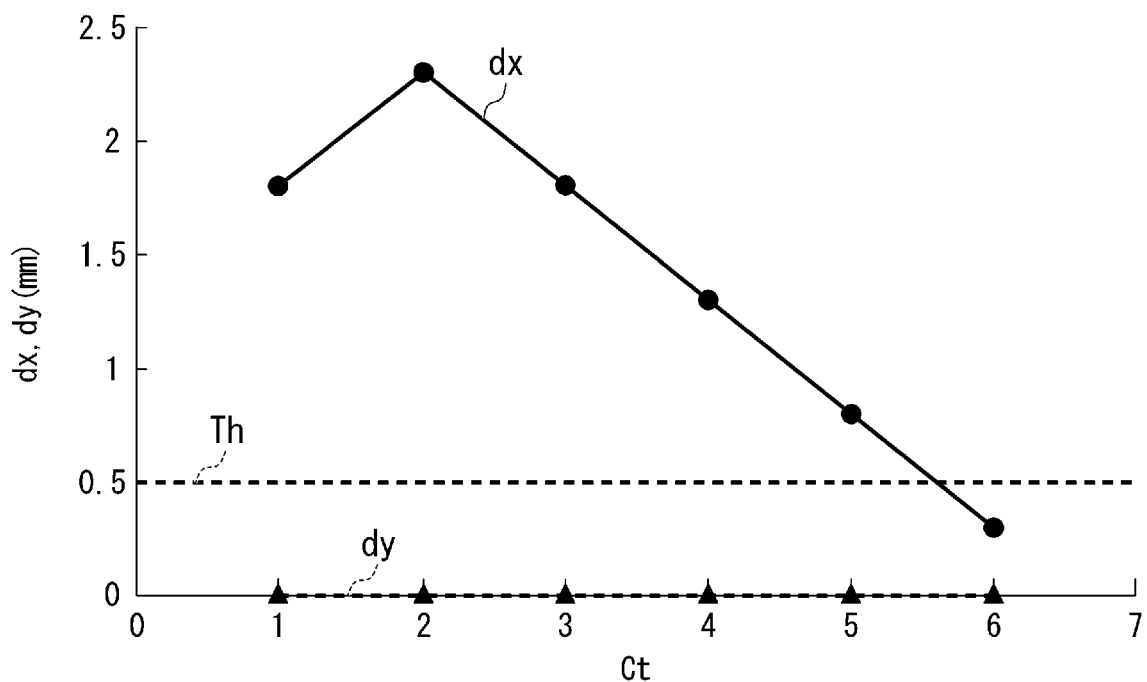
FIG. 6 is a table showing a first action example of the projection system.
FIG. 7 is a graph showing the first action example.
FIG. 8 is a table showing a second action example of the projection system.

A first action example of the projection system 1 will be described below with reference to FIGS. 6 and 7. FIG. 6 is a table showing the first action example of the projection system 1. In FIG. 6, Ct indicates the number of times the pixel shift correction has been performed. The symbols "A, +X" described in the remarks field of FIG. 6 mean moving the first image 100A by the unit amount of displacement toward the positive end of the X direction. The symbols "A, −X" described in the remarks field of FIG. 6 mean moving the first image 100A by the unit amount of displacement the toward negative end of the X direction. The symbol described in the remarks field of FIG. 6 indicates that neither the X-axis correction nor the Y-axis correction is performed when the pixel shift correction is performed.

Note that the values and units of the amount of X-axis shift dx and the amount of Y-axis shift dy described in FIG. 6 are provisional values and units used to make the description easy, and the actual values and units of the amount of X-axis shift dx and the amount of Y-axis shift dy may differ from those in FIG. 6. FIG. 7 is a graph showing the first action example. The horizontal axis of FIG. 7 represents the value of Ct described in FIG. 6, and the vertical axis of FIG. 7 represents the values of the amount of X-axis shift dx and the amount of Y-axis shift dy described in FIG. 6. It is assumed in the first action example that the threshold Th and the unit amount of displacement are each set at 0.5 (mm).

1-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A. The captured image generated by executing step S1 of the first pixel shift correction is an example of a first captured image.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to a third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

Instead, in step S14, the first processing apparatus 70A may move the first image 100A from the first position to the third position by changing the position of the first projection lens 23A with the first actuator 24A. Still instead, in step S14, the first processing apparatus 70A may move the first image 100A from the first position to the third position by changing the position where the first panel image is displayed in the display region of the first liquid crystal panel 22A.

The process described above is the end of the first pixel shift correction.

1-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200. The captured image generated by executing step S1 of the second pixel shift correction is an example of a second captured image.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 2.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links the amount of X-axis shift dx temporarily saved in the first memory 60A with the value of the first count variable nx and saves the result in the first memory 60A (step S12). That is, 2.3 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 2.3 (mm), and the previous value dx(1) of the amount of X-axis shift dx is 1.8 (mm). In this case, since the current value dx(2) of the amount of X-axis shift dx is greater than the previous value dx(1) of the amount of X-axis shift dx, Conditional Expression (1) is satisfied. The first processing apparatus 70A therefore determines that Conditional Expression (1) is satisfied (Yes in step S15), and transitions to step S16.

Upon the transition to step S16, the first processing apparatus 70A moves the first image 100A by 0.5 (mm) in the opposite direction of the previous shift direction, that is, in the X direction toward the negative end thereof (step S16).

The process of step S16 moves the first image 100A from the third position to a fourth position separate therefrom by 0.5 (mm) toward the negative end of the X direction. That is, the process of step S16 is in other words the process in which the first processing apparatus 70A moves the first image 100A from the third position to the fourth position separate therefrom by 0.5 (mm) toward the negative end of the X direction. The position separate from the first position by 0.5 (mm) toward the positive end of the X direction is the third position, and the position separate from the third position by 0.5 (mm) toward the negative end of the X direction is the fourth position. As a result, the fourth position coincides with the first position.

The process described above is the end of the second pixel shift correction.

When the current value dx(2) of the amount of X-axis shift dx is greater than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx increases. Therefore, in this case, when the second pixel shift correction is performed, the first image 100A can be moved by the unit amount of displacement in the opposite direction of the previous shift direction, that is, in the X direction toward the negative end thereof to correct the wrong shift direction at an early stage and hence reduce the amount of X-axis shift dx.

1-3. Third Pixel Shift Correction (Ct=3)

Upon the start of the third pixel shift correction, the first t processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the fourth position on the projection surface 200 and the second image 100B projected by the second projector 10B at the second position on the projection surface 200. The captured image generated by executing step S1 of the third pixel shift correction is an example of a third captured image.

The first processing apparatus 70A subsequently calculates the amount of X-axis shift dx and the amount of Y-axis shift dy in the overlapping region 110 based on the captured image (step S2). Step S2 of the third pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 1.8 (mm), and the previous value dx(2) of the amount of X-axis shift dx is 2.3 (mm). In this case, since the current value dx(3) of the amount of X-axis shift dx is smaller than the previous value dx(2) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the fourth position to a fifth position separate therefrom by 0.5 (mm) toward the negative end of the X direction. That is, the process of step S17 is in other words the process in which the first processing apparatus 70A moves the first image 100A from the fourth position to the fifth position separate therefrom by 0.5 (mm) toward the negative end of the X direction.

The process described above is the end of the third pixel shift correction.

When the current value dx(3) of the amount of X-axis shift dx is smaller than the previous value dx(2) of the amount of X-axis shift dx as a result of the third pixel shift correction, it is speculated that moving the first image 100A toward the negative end of the X direction in the second pixel shift correction corrects the wrong shift direction and reduces the amount of X-axis shift dx, as described above. Therefore, in this case, when the third pixel shift correction is performed, the first image 100A can be moved by the unit amount of displacement in the same direction as the previous shift direction, that is, in the X direction toward the negative end thereof to further reduce the amount of X-axis shift dx.

1-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the fifth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 1.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "4" at this point.

The first processing apparatus 70A subsequently links the amount of X-axis shift dx temporarily saved in the first memory 60A with the value of the first count variable nx and saves the result in the first memory 60A (step S12). That is, 1.3 (mm), which is the value of the amount of X-axis shift dx, is linked with "4", which is the value of the first count variable nx, and saved in the first memory 60A.

The first processing apparatus 70A subsequently evaluates whether the value of the first count variable nx is "1" (step S13). Since the value of the first count variable nx is "4" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(4) of the amount of X-axis shift dx is 1.3 (mm), and the previous value dx(3) of the amount of X-axis shift dx is 1.8 (mm). In this case, since the current value dx(4) of the amount of X-axis shift dx is smaller than the previous value dx(3) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the fifth position to a tenth position separate therefrom by 0.5 (mm) toward the negative end of the X direction. That is, the process of step S17 is in other words the process in which the first processing apparatus 70A moves the first image 100A from the fifth position to the tenth position separate therefrom by 0.5 (mm) toward the negative end of the X direction.

The process described above is the end of the fourth pixel shift correction.

When the current value dx(4) of the amount of X-axis shift dx is smaller than the previous value dx(3) of the amount of X-axis shift dx as a result of the fourth pixel shift correction, it is speculated that moving the first image 100A toward the negative end of the X direction in the third pixel shift correction reduces the amount of X-axis shift dx. Therefore, in this case, when the fourth pixel shift correction is performed, the first image 100A can be moved by the unit amount of displacement in the same direction as the previous shift direction, that is, in the X direction toward the negative end thereof to further reduce the amount of X-axis shift dx.

1-5. Fifth Pixel Shift Correction (Ct=5)

Upon the start of the fifth pixel shift correction, the first processing apparatus 70A first acquires a captured image of the projection surface 200 from the camera 80 (step S1). More specifically, in step S1 of the fifth pixel shift correction, the first processing apparatus 70A acquires a captured image from the camera 80 by causing the camera 80 to capture an image of the projection surface 200 with the first image 100A projected by the first projector 10A at the tenth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fifth pixel shift correction provides 0.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "5" at this point.

The first processing apparatus 70A subsequently links the amount of X-axis shift dx temporarily saved in the first memory 60A with the value of the first count variable nx and saves the result in the first memory 60A (step S12). That is, 0.8 (mm), which is the value of the amount of X-axis shift dx, is linked with "5", which is the value of the first count variable nx, and saved in the first memory 60A.

The first processing apparatus 70A subsequently evaluates whether the value of the first count variable nx is "1" (step S13). Since the value of the first count variable nx is "5" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(5) of the amount of X-axis shift dx is 0.8 (mm), and the previous value dx(4) of the amount of X-axis shift dx is 1.3 (mm). In this case, since the current value dx(5) of the amount of X-axis shift dx is smaller than the previous value dx(4) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the tenth position to an eleventh position separate therefrom by 0.5 (mm) toward the negative end of the X direction. That is, the process of step S17 is in other words the process in which the first processing apparatus 70A moves the first image 100A from the tenth position to the eleventh position separate therefrom by 0.5 (mm) toward the negative end of the X direction.

The process described above is the end of the fifth pixel shift correction.

When the current value dx(5) of the amount of X-axis shift dx is smaller than the previous value dx(4) of the amount of X-axis shift dx as a result of the fifth pixel shift correction, it is speculated that moving the first image 100A toward the negative end of the X direction in the fourth pixel shift correction further reduces the amount of X-axis shift dx. Therefore, in this case, when the fifth pixel shift correction is performed, the first image 100A can be moved by the unit amount of displacement in the same direction as the previous shift direction, that is, in the X direction toward the negative end thereof to further reduce the amount of X-axis shift dx.

1-6. Sixth Pixel Shift Correction (Ct=6)

Upon the start of the sixth pixel shift correction, the first processing apparatus 70A first acquires a captured image of the projection surface 200 from the camera 80 (step S1). More specifically, in step S1 of the sixth p shift correction, the first processing apparatus 70A acquires a captured image from the camera 80 by causing the camera 80 to capture an image of the projection surface 200 with the first image 100A projected by the first projector 10A at the eleventh position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the sixth pixel shift correction provides 0.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the sixth pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the sixth pixel shift correction.

The first action example has been described. As described above, in the first action example, performing the pixel shift correction and the X-axis correction five times makes the amount of X-axis shift dx and the amount of Y-axis shift dy both smaller than the threshold Th, so that the X-axis shift correction is not performed when the sixth pixel shift correction is performed.

As already described, when the current value dx(2) of the amount of X-axis shift dx is greater than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx increases. Therefore, in this case, when the second pixel shift correction is performed, the first image 100A can be moved in the opposite direction of the previous shift direction to correct the wrong shift direction at an early stage and hence reduce the amount of X-axis shift dx. As described above, the present embodiment allows correction of the pixel shift between the first image 100A and the second image 100B only with the aid of the known amount and direction of the relative pixel shift between the first image 100A and the second image 100B, which are projected to overlap with each other.

Furthermore, in the present embodiment, the X-axis correction is performed when the amount of X-axis shift dx is greater than the amount of Y-axis shift dy, and the Y-axis correction is performed when the amount of X-axis shift dx is smaller than the amount of Y-axis shift dy. Preferentially carrying out the process of reducing a larger amount of pixel shift out of the amount of X-axis shift dx and the amount of Y-axis shift dy as described above can correct the pixel shift between the first image 100A and the second image 100B at an early stage. In the first action example, the X-axis correction, that is, the process of reducing the amount of X-axis shift dx is preferentially carried out.

When the current value dx(3) of the amount of X-axis shift dx is smaller than the previous value dx(2) of the amount of X-axis shift dx as a result of the third pixel shift correction, it is speculated that moving the first image 100A toward the negative end of the X direction in the second pixel shift correction corrects the wrong shift direction and reduces the amount of X-axis shift dx. Therefore, in this case, when the pixel shift correction is performed for the third time and later, the first image 100A can be moved in the same direction as the previous shift direction to reduce the amount of X-axis shift dx to a value smaller than the threshold Th.

As understood from the description of the aforementioned first action example, the first processing apparatus 70A performs the first pixel shift correction and the second pixel shift correction to achieve a projection image adjustment method including steps 1 to 6 described below.

The first step is acquiring the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A.

The second step is acquiring based on the first captured image the amount of X-axis shift dx along the X-axis between the first image 100A and the second image 100B and the amount of Y-axis shift dy along the Y-axis between the first image 100A and the second image 100B. The X-axis is an example of a first axis that is a coordinate axis of the global coordinate system. The Y-axis is an example of a second axis perpendicular to the first axis. The amount of X-axis shift dx acquired based on the first captured image, that is, the amount of X-axis shift dx acquired when the first pixel shift correction is performed is an example of a first amount of shift. The amount of Y-axis shift dy acquired based on the first captured image, that is, the amount of Y-axis shift dy acquired when the first pixel shift correction is performed, is an example of a second amount of shift.

The third step is causing the first projector 10A to move the first image 100A from the first position to the third position separate therefrom by the unit amount of displacement toward the positive end of the X direction when the first and second amounts of shift satisfy a first condition. The X direction toward the positive end thereof is an example of a first direction corresponding to the direction toward one end of the first axis. The third position separate from the first position by the unit amount of displacement toward the positive end of the X direction is an example of the third position separate from the first position by a first distance in the first direction.

The first condition is a condition that the first amount of shift is greater than the second amount of shift. That is, the first condition is a condition that the amount of X-axis shift dx acquired based on the first captured image is greater than the amount of Y-axis shift dy acquired based on the first captured image.

The first to third steps described above are achieved by the first processing apparatus 70A performing the first pixel shift correction.

The fourth step is acquiring the second captured image from the camera 80 by causing the camera 80 to capture an image of the projection surface 200 with the first image 100A projected by the first projector 10A at the third position and the second image 100B projected by the second projector 10B at the second position.

The fifth step is acquiring based on the second captured image the amount of X-axis shift dx along the X-axis between the first image 100A and the second image 100B and the amount of Y-axis shift dy along the Y-axis between the first image 100A and the second image 100B. The amount of X-axis shift dx acquired based on the second captured image, that is, the amount of X-axis shift dx acquired when the second pixel shift correction is performed is an example of a third amount of shift. The amount of Y-axis shift dy acquired based on the second captured image, that is, the amount of Y-axis shift dy acquired when the second pixel shift correction is performed is an example of a fourth amount of shift.

The sixth step is causing the first projector 10A to move the first image 100A from the third position to the fourth position separate therefrom by the unit amount of displacement toward the negative end of the X direction when the third and fourth amounts of shift satisfy the second condition and the third amount of shift is greater than the first amount of shift. The direction X toward the negative end thereof is an example of a second direction that is the opposite direction of the first direction. The fourth position separate from the third position by the unit amount of displacement toward the negative end of the X direction, is an example of the fourth position separate from the third position by a second distance in the second direction.

The second condition is a condition that the third amount of shift is greater than the fourth amount of shift. That is, the second condition is a condition that the amount of X-axis shift dx acquired based on the second captured image is greater than the amount of Y-axis shift dy acquired based on the second captured image.

The fourth to sixth steps described above are achieved by the first processing apparatus 70A performing the second pixel shift correction.

The projection image adjustment method further includes seventh to ninth steps described below.

The seventh step includes acquiring the third captured image from the camera 80 by causing the camera 80 to capture an image of the projection surface 200 with the first image 100A projected by the first projector 10A at the fourth position and the second image 100B projected by the second projector 10B at the second position.

The eighth step includes acquiring based on the third captured image the amount of X-axis shift dx along the X-axis between the first image 100A and the second image 100B and the amount of Y-axis shift dy along the Y-axis between the first image 100A and the second image 100B. The amount of X-axis shift dx acquired based on the third captured image, that is, the amount of X-axis shift dx acquired when the third pixel shift correction is performed is an example of a fifth amount of shift. The amount of Y-axis shift dy acquired based on the third captured image, that is, the amount of Y-axis shift dy acquired when the third pixel shift correction is performed is an example of a sixth amount of shift.

The ninth step is causing the first projector 10A to move the first image 100A from the fourth position to the fifth position separate therefrom by the unit amount of displacement toward the negative end of the X direction when the fifth and sixth amounts of shift satisfy a third condition and the fifth amount of shift is smaller than the third amount of shift. The fifth position separate from the fourth position by the unit amount of displacement toward the negative end of the X direction is an example of the fifth position separate from the fourth position by a third distance in the second direction.

The third condition is a condition that the fifth amount of shift is greater than the sixth amount of shift. That is, the third condition is a condition that the amount of X-axis shift dx acquired based on the third captured image is greater than the amount of Y-axis shift dy acquired based on the third captured image.

The seventh to ninth steps described above are achieved by the first processing apparatus 70A performing the third pixel shift correction.

In the projection image adjustment method, the position of the first image 100A projected onto the projection surface 200 changes in accordance with the position of the first projection lens 23A provided in the first projector 10A, and causing the first projector 10A to move the first image 100A from the first position to the third position includes changing the position of the first projection lens 23A to move the first image 100A from the first position to the third position.

In the projection image adjustment method, the first image 100A corresponds to the first panel image displayed in the display region of the first liquid crystal panel 22A provided in the first projector 10A, and causing the first projector 10A to move the first image 100A from the first position to the third position includes changing the position where the first panel image is displayed in the display region of the first liquid crystal panel 22A to move the first image 100A from the first position to the third position. The first liquid crystal panel 22A is an example of a first panel.

2. Second Action Example

A second action example of the projection system 1 will be described below with reference to FIGS. 8 and 9. FIG. 8 is a table showing the second action example of the projection system 1. FIG. 9 is a graph showing the second action example. The horizontal axis of FIG. 9 represents the value of Ct described in FIG. 8, and the vertical axis of FIG. 9 represents the values of the amount of X-axis shift dx and the amount of Y-axis shift dy described in FIG. 8. It is assumed also in the second action example that the threshold Th and the unit amount of displacement are each set at 0.5 (mm), as in the first action example.

2-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A. The captured image generated by executing step S1 of the first pixel shift correction is an example of the first captured image.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 1.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 1.8 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to the third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

The process described above is the end of the first pixel shift correction.

2-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200. The captured image generated by executing step S1 of the second pixel shift correction is an example of the second captured image.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 1.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links the amount of X-axis shift dx temporarily saved in the first memory 60A with the value of the first count variable nx and saves the result in the first memory 60A (step S12). That is, 1.3 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 1.3 (mm), and the previous value dx(1) of the amount of X-axis shift dx is 1.8 (mm). In this case, since the current value dx(2) of the amount of X-axis shift dx is smaller than the previous value dx(1) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the positive end thereof (step S17).

The process of step S17 moves the first image 100A from the third position to a sixth position separate therefrom by 0.5 (mm) toward the positive end of the X direction. That is, the process of step S17 is in other words the process in which the first processing apparatus 70A moves the first image 100A from the third position to the sixth position separate therefrom by 0.5 (mm) toward the positive end of the X direction.

The process described above is the end of the second pixel shift correction.

When the current value dx(2) of the amount of X-axis shift dx is smaller than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx decreases. Therefore, in this case, when the second pixel shift correction is performed, the first image 100A can be moved by the unit amount of displacement in the same direction as the previous shift direction, that is, in the X direction toward the positive end thereof to further reduce the amount of X-axis shift dx.

2-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the sixth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the third pixel shift correction provides 0.8 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 0.8 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 0.8 (mm), and the previous value dx(2) of the amount of X-axis shift dx is 1.3 (mm). In this case, since the current value dx(3) of the amount of X-axis shift dx is smaller than the previous value dx(2) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as s the previous shift direction, that is, in the X direction toward the positive end thereof (step S17).

The process of step S17 moves the first image 100A from the sixth position to a twelfth position separate therefrom by 0.5 (mm) toward the positive end of the X direction. That is, the process of step S17 is in other words the process in which the first processing apparatus 70A moves the first image 100A from the sixth position to the twelfth position separate therefrom by 0.5 (mm) toward the positive end of the X direction.

The process described above is the end of the third pixel shift correction.

When the current value dx(3) of the amount of X-axis shift dx is smaller than the previous value dx(2) of the amount of X-axis shift dx as a result of the third pixel shift correction, it is speculated that moving the first image 100A toward the positive end of the X direction in the second pixel shift correction further reduces the amount of X-axis shift dx. Therefore, in this case, when the third pixel shift correction is performed, the first image 100A can be moved by the unit amount of displacement in the same direction as the previous shift direction, that is, in the X direction toward the positive end thereof to further reduce the amount of X-axis shift dx.

2-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the twelfth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 0.3 (mm) as the amount of X-axis shift dx and 0 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the fourth pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the fourth pixel shift correction.

The second action example has been described. As described above, in the second action example, performing the pixel shift correction and the X-axis correction three times makes the amount of X-axis shift dx and the amount of Y-axis shift dy both smaller than the threshold Th, so that the X-axis shift correction is not performed when the fourth pixel shift correction is performed.

As already described, when the current value dx(2) of the amount of X-axis shift dx is smaller than the previous value dx(1) of the amount of X-axis shift dx as a result of the second pixel shift correction, it is speculated that the X direction toward the positive end thereof, in which the first image 100A was moved when the first pixel shift correction was performed, is the direction in which the amount of X-axis shift dx decreases. Therefore, in this case, when the pixel shift correction is performed for the second time and later, the first image 100A can be moved in the same direction as the previous shift direction to reduce the amount of X-axis shift dx to a value smaller than the threshold Th.

The projection image adjustment method further includes causing the first projector 10A to move the first image 100A from the third position to the sixth position separate therefrom by the unit amount of displacement toward the positive end of the X direction when the third and fourth amounts of shift satisfy the second condition and the third amount of shift is smaller than the first amount of shift, as will be understood from the description of the second action example described above. The sixth position separate from the third position by the unit amount of displacement toward the positive end of the X direction is an example of the sixth position separate from the third position by a fourth distance in the first direction.

The second condition is a condition that the third amount of shift is greater than the fourth amount of shift, as described with reference to the first action example. That is, the second condition is a condition that the amount of X-axis shift dx acquired based on the second captured image is greater than the amount of Y-axis shift dy acquired based on the second captured image. The first amount of shift is the amount of X-axis shift dx acquired based on the first captured image.

3. Third Action Example

A third action example of the projection system 1 will be described below with reference to FIGS. 10 and 11. FIG. 10 is a table showing the third action example of the projection system 1. FIG. 11 is a graph showing the third action example. The horizontal axis of FIG. 11 represents the value of Ct described in FIG. 10, and the vertical axis of FIG. 11 represents the values of the amount of X-axis shift dx and the amount of Y-axis shift dy described in FIG. 10. It is assumed also in the third action example that the threshold Th and the unit amount of displacement are each set at 0.5 (mm), as in the first action example.

3-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel: correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A. The captured image generated by executing step S1 of the first pixel shift correction is an example of the first captured image.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 0 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of Y-axis shift dy is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs Y-axis correction (step S6).

Upon the start of the Y-axis correction, the first processing apparatus 70A first increments the value of the second count variable ny (step S21). The value of the second count variable ny is "1" at this point.

The first processing apparatus 70A subsequently links the amount of Y-axis shift dy temporarily saved in the first memory 60A with the value of the second count variable ny and saves the result in the first memory 60A (step S22). That is, 0.8 (mm), which is the value of the amount of Y-axis shift dy, is linked with "1", which is the value of the second count variable ny, and saved in the first memory 60A.

The first processing apparatus 70A subsequently evaluates whether the value of the second count variable ny is "1" (step S23). Since the value of the second count variable ny is "1" at this point, the first processing apparatus 70A determines that the value of the second count variable ny is "1" (Yes in step S23), and transitions to step S24.

Upon the transition to step S24, the first processing apparatus 70A moves the first image 100A by 0.5 (mm) toward the positive end of Y direction (step S24). The process of step S24 moves the first image 100A from the first position to a seventh position separate therefrom by 0.5 (mm) toward the positive end of the Y direction. That is, the process of step S24 is in other words the process in which the first processing apparatus 70A moves the first image 100A from the first position to the seventh position separate therefrom by 0.5 (mm) toward the positive end of the Y direction.

The process described above is the end of the first pixel shift correction.

3-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the seventh position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 0 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of Y-axis shift dy is greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is smaller than the amount of Y-axis shift dy (No in step S4), and performs the Y-axis correction (step S6).

Upon the start of the Y-axis correction, the first processing apparatus 70A first increments the value of the second count variable ny (step S21). The value of the second count variable ny is "2" at this point.

The first processing apparatus 70A subsequently links the amount of Y-axis shift dy temporarily saved in the first memory 60A with the value of the second count variable ny and saves the result in the first memory 60A (step S22). That is, 1.3 (mm), which is the value of the amount of Y-axis shift dy, is linked with "2", which is the value of the second count variable ny, and saved in the first memory 60A.

The first processing apparatus 70A subsequently evaluates whether the value of the second count variable ny is "1" (step S23). Since the value of the second count variable ny is "2" at this point, the first processing apparatus 70A determines that the value of the second count variable ny is not "1" (No in step S23), and transitions to step S25.

Upon the transition to step S25, the first processing apparatus 70A evaluates whether Conditional Expression (2) described above is satisfied (step S25). At this point, the current value dy(2) of the amount of Y-axis shift dy is 1.3 (mm), and the previous value dy(1) of the amount of Y-axis shift dy is 0.8 (mm). In this case, since the current value dy(2) of the amount of Y-axis shift dy is greater than the previous value dy(1) of the amount of Y-axis shift dy, Conditional Expression (2) is satisfied. The first processing apparatus 70A therefore determines that Conditional Expression (2) is satisfied (Yes in step S25), and transitions to step S26.

Upon the transition to step S26, the first processing apparatus 70A moves the first image 100A by 0.5 (mm) in the opposite direction of the previous shift direction, that is, in the Y direction toward the negative end thereof (step S26).

The process of step S26 moves the first image 100A from the seventh position to an eighth position separate therefrom by 0.5 (mm) toward the negative end of the Y direction. That is, the process of step S26 is in other words the process in which the first processing apparatus 70A moves the first image 100A from the seventh position to the eighth position separate therefrom by 0.5 (mm) toward the negative end of the Y direction. The position separate from the first position by 0.5 (mm) toward the positive end of the Y direction is the seventh position, and the position separate from the seventh position by 0.5 (mm) toward the negative end of the Y direction is the eighth position. As a result, the eighth position coincides with the first position.

The process described above is the end of the second pixel shift correction.

When the current value dy(2) of the amount of Y-axis shift dy is greater than the previous value dy(1) of the amount of Y-axis shift dy as a result of the second pixel shift correction, it is speculated that the Y direction toward the positive end thereof, in which the first image 100A was moved when the first pixel shift correction was performed, is the direction in which the amount of Y-axis shift dy increases. Therefore, in this case, when the second pixel shift correction is performed, the first image 100A can be moved by the unit amount of displacement in the opposite direction of the previous shift direction, that is, in the Y direction toward the negative end thereof to correct the wrong shift direction at an early stage and hence reduce the amount of Y-axis shift dy.

3-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the eighth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the third pixel shift correction provides 0 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of Y-axis shift dy is greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is smaller than the amount of Y-axis shift dy(No in step S4), and performs the Y-axis correction (step S6).

Upon the start of the Y-axis correction, the first processing apparatus 70A first increments the value of the second count variable ny (step S21). The value of the second count variable ny is "3" at this point.

The first processing apparatus 70A subsequently links the amount of Y-axis shift dy temporarily saved in the first memory 60A with the value of the second count variable ny and saves the result in the first memory 60A (step S22). That is, 0.8 (mm), which is the value of the amount of Y-axis shift dy, is linked with "3", which is the value of the second count variable ny, and saved in the first memory 60A.

The first processing apparatus 70A subsequently evaluates whether the value of the second count variable ny is "1"

(step S23). Since the value of the second count variable ny is "3" at this point, the first processing apparatus 70A determines that the value of the second count variable ny is not "1" (No in step S23), and transitions to step S25.

Upon the transition to step S25, the first processing apparatus 70A evaluates whether Conditional Expression (2) described above is satisfied (step S25). At this point, the current value dy(3) of the amount of Y-axis shift dy is 0.8 (mm), and the previous value dy(2) of the amount of Y-axis shift dy is 1.3 (mm). In this case, since the current value dy(3) of the amount of Y-axis shift dy is smaller than the previous value dy(2) of the amount of Y-axis shift dy, Conditional Expression (2) is not satisfied. The first processing apparatus 70A therefore determines that Conditional Expression (2) is not satisfied (No in step S25), and transitions to step S27.

Upon the transition to step S27, the first processing apparatus 70A moves the first image 100A by 0.5 (mm) in the same direction as s the previous shift direction, that is, in the Y direction toward the negative end thereof (step S27).

The process of step S27 moves the first image 100A from the eighth position to a ninth position separate therefrom by 0.5 (mm) toward the negative end of the Y direction. That is, the process of step S27 is in other words the process in which the first processing apparatus 70A moves the first image 100A from the eighth position to the ninth position separate therefrom by 0.5 (mm) toward the negative end of the Y direction.

The process described above is the end of the third pixel shift correction.

When the current value dy(3) of the amount of Y-axis shift dy is smaller than the previous value dy(2) of the amount of Y-axis shift dy as a result of the third pixel shift correction, it is speculated that moving the first image 100A toward the negative end of the Y direction in the second pixel shift correction corrects the wrong shift direction and reduces the amount of Y-axis shift dy, as described above. Therefore, in this case, when the third pixel shift correction is performed, the first image 100A can be moved by the unit amount of displacement in the same direction as the previous shift direction, that is, in the Y direction toward the negative end thereof to further reduce the amount of Y-axis shift dy.

3-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the ninth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 0 (mm) as the amount of X-axis shift dx and 0.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the fourth pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the fourth pixel shift correction.

The third action example has been described. As described above, in the third action example, performing the pixel shift correction and the Y-axis correction three times makes the amount of X-axis shift dx and the amount of Y-axis shift dy both smaller than the threshold Th, so that the Y-axis shift correction is not performed when the fourth pixel shift correction is performed.

In the third action example, when the first pixel shift correction is performed, the amount of Y-axis shift dy is determined to be greater than the amount of X-axis shift dx, so that the Y-axis correction, that is, the process of reducing the amount of Y-axis shift dy is preferentially carried out. When the current value dy(2) of the amount of Y-axis shift dy is greater than the previous value dy(1) of the amount of Y-axis shift dy as a result of the second pixel shift correction, it is speculated that the Y direction toward the positive end thereof, in which the first image 100A was moved when the first pixel shift correction was performed, the is direction in which the amount of Y-axis shift dy increases. Therefore, in this case, when the second pixel shift correction is performed, the first image 100A can be moved in the opposite direction of the previous shift direction to correct the wrong shift direction at an early stage and hence reduce the amount of Y-axis shift dy.

When the current value dy(3) of the amount of Y-axis shift dy is smaller than the previous value dy(2) of the amount of Y-axis shift dy as a result of the third pixel shift correction, it is speculated that moving the first image 100A toward the negative end of the Y direction in the second pixel shift correction corrects the wrong shift direction and reduces the amount of Y-axis shift dy. Therefore, in this case, when the pixel shift correction is performed for the third time and later, the first image 100A can be moved in the same direction as the previous shift direction to reduce the amount of Y-axis shift dy to a value smaller than the threshold Th.

The projection image adjustment method further includes causing the first projector 10A to move the first image 100A from the first position to the seventh position separate therefrom by the unit amount of displacement toward the positive end of the Y direction when the first and second amounts of shift do not satisfy the first condition, as will be understood from the description of the third action example described above. The Y direction toward the positive end thereof is an example of a third direction corresponding to the direction toward one end of the second axis. The seventh position separate from the first position by the unit amount of displacement toward the positive end of the Y direction is an example of the seventh position separate from the first position by a fifth distance in the third direction.

The first condition is a condition that the first amount of shift is greater than the second amount of shift, as described with reference to the first action example. That is, the first condition is a condition that the amount of X-axis shift dx acquired based on the first captured image is greater than the amount of Y-axis shift dy acquired based on the first captured image.

4. Fourth Action Example

Figure 13:
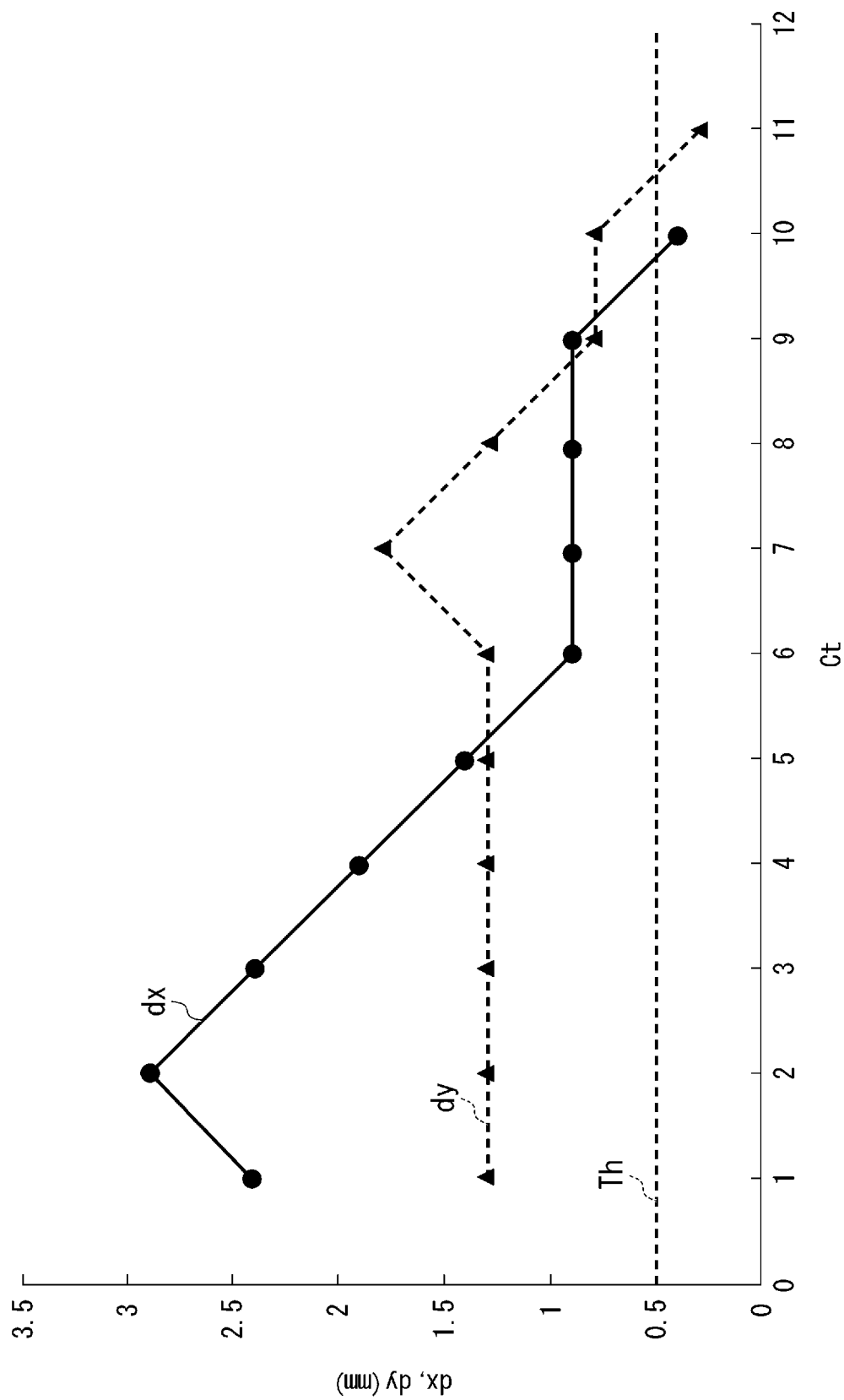
FIG. 13 is a graph showing the fourth action example.

A fourth action example of the projection system 1 will be described below with reference to FIGS. 12 and 13. FIG. 12 is a table showing the fourth action example of the projection system 1. FIG. 13 is a graph showing the fourth action example. The horizontal axis of FIG. 13 represents the value of Ct described in FIG. 12, and the vertical axis of FIG. 13 represents the values of the amount of X-axis shift dx and the amount of Y-axis shift dy described in FIG. 12. It is assumed also in the fourth action example that the threshold Th and the unit amount of displacement are each set at 0.5 (mm), as in the first action example.

4-1. First Pixel Shift Correction (Ct=1)

Upon the start of the first pixel shift correction, the first processing apparatus 70A first acquires a captured image of the projection surface 200 from the camera 80 (step S1). More specifically, in step S1 of the first pixel shift correction, the first processing apparatus 70A acquires a captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A.

The first processing apparatus 70A subsequently calculates the amount of X-axis shift dx and the amount of Y-axis shift dy in the overlapping region 110 based on the captured image (step S2). It is assumed that step S2 of the first pixel shift correction provides 2.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "1" at this point.

The first processing apparatus 70A subsequently links the amount of X-axis shift dx temporarily saved in the first memory 60A with the value of the first count variable nx and saves the result in the first memory 60A (step S12). That is, 2.4 (mm), which is the value of the amount of X-axis shift dx, is linked with "1", which is the value of the first count variable nx, and saved in the first memory 60A.

The first processing apparatus 70A subsequently evaluates whether the value of the first count variable nx is "1" (step S13). Since the value of the first count variable nx is "1" at this point, the first processing apparatus 70A determines that the value of the first count variable nx is "1" (Yes in step S13), and transitions to step S14.

Upon the transition to step S14, the first processing apparatus 70A moves the first image 100A by 0.5 (mm) toward the positive end of X direction (step S14). The process of step S14 moves the first image 100A from the first position to the third position separate therefrom by 0.5 (mm) toward the positive end of the X direction. That is, the process of step S14 is in other words the process in which the first processing apparatus 70A moves the first image 100A from the first position to the third position separate therefrom by 0.5 (mm) toward the positive end of the X direction.

The process described above is the end of the first pixel shift correction.

4-2. Second Pixel Shift Correction (Ct=2)

Upon the start of the second pixel shift correction, the first processing apparatus 70A first acquires a captured image of the projection surface 200 from the camera 80 (step S1). More specifically, in step S1 of the second pixel shift correction, the first processing apparatus 70A acquires a captured image from the camera 80 by causing the camera 80 to capture an image of the projection surface 200 with the first image 100A projected by the first projector 10A at the third position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). It is assumed that step S2 of the second pixel shift correction provides 2.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy (step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "2" at this point.

The first processing apparatus 70A subsequently links shift dx the amount of X-axis temporarily saved in the first memory 60A with the value of the first count variable nx and saves the result in the first memory 60A (step S12). That is, 2.9 (mm), which is the value of the amount of X-axis shift dx, is linked with "2", which is the value of the first count variable nx, and saved in the first memory 60A.

The first processing apparatus 70A subsequently evaluates whether the value of the first count variable nx is "1" (step S13). Since the value of the first count variable nx is "2" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(2) of the amount of X-axis shift dx is 2.9 (mm), and the previous value dx(1) of the amount of X-axis shift dx is 2.4 (mm). In this case, since the current value dx(2) of the amount of X-axis shift dx is greater than the previous value dx(1) of the amount of X-axis shift dx, Conditional Expression (1) is satisfied. The first processing apparatus 70A therefore determines that Conditional Expression (1) is satisfied (Yes in step S15), and transitions to step S16.

Upon the transition to step S16, the first processing apparatus 70A moves the first image 100A by 0.5 (mm) in the opposite direction of the previous shift direction, that is, in the X direction toward the negative end thereof (step S16).

The process of step S16 moves the first image 100A from the third position to the fourth position separate therefrom by 0.5 (mm) toward the negative end of the X direction. That is, the process of step S16 is in other words the process in which the first processing apparatus 70A moves the first image 100A from the third position to the fourth position separate therefrom by 0.5 (mm) toward the negative end of the X direction. The position separate from the first position by 0.5 (mm) toward the positive end of the X direction is the third position, and the position separate from the third position by 0.5 (mm) toward the negative end of the X direction is the fourth position. As a result, the fourth position coincides with the first position.

The process described above is the end of the second pixel shift correction.

4-3. Third Pixel Shift Correction (Ct=3)

Upon the start of the third pixel shift correction, the first processing apparatus 70A first acquires a captured image of the projection surface 200 from the camera 80 (step S1). More specifically, in step S1 of the third pixel shift correction, the first processing apparatus 70A acquires a captured image from the camera 80 by causing the camera 80 to capture an image of the projection surface 200 with the first image 100A projected by the first projector 10A at the fourth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the third pixel shift correction provides 2.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "3" at this point.

The first processing apparatus 70A subsequently links the amount of X-axis shift dx temporarily saved in the first memory 60A with the value of the first count variable nx and saves the result in the first memory 60A (step S12). That is, 2.4 (mm), which is the value of the amount of X-axis shift dx, is linked with "3", which is the value of the first count variable nx, and saved in the first memory 60A.

The first processing apparatus 70A subsequently evaluates whether the value of the first count variable nx is "1" (step S13). Since the value of the first count variable nx is "3" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(3) of the amount of X-axis shift dx is 2.4 (mm), and the previous value dx(2) of the amount of X-axis shift dx is 2.9 (mm). In this case, since the current value dx(3) of the amount of X-axis shift dx is smaller than the previous value dx(2) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the fourth position to the fifth position separate therefrom by 0.5 (mm) toward the negative end of the X direction. That is, the process of step S17 is in other words the process in which the first processing apparatus 70A moves the first image 100A from the fourth position to the fifth position separate therefrom by 0.5 (mm) toward the negative end of the X direction.

The process described above is the end of the third pixel shift correction.

4-4. Fourth Pixel Shift Correction (Ct=4)

Upon the start of the fourth pixel shift correction, the first processing apparatus 70A first acquires a captured image of the projection surface 200 from the camera 80 (step S1). More specifically, in step S1 of the fourth pixel shift correction, the first processing apparatus 70A acquires a captured image from the camera 80 by causing the camera 80 to capture an image of the projection surface 200 with the first image 100A projected by the first projector 10A at the fifth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fourth pixel shift correction provides 1.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "4" at this point.

The first processing apparatus 70A subsequently links the amount of X-axis shift dx temporarily saved in the first memory 60A with the value of the first count variable nx and saves the result in the first memory 60A (step S12). That is, 1.9 (mm), which is the value of the amount of X-axis shift dx, is linked with "4", which is the value of the first count variable nx, and saved in the first memory 60A.

The first processing apparatus 70A subsequently evaluates whether the value of the first count variable nx is "1" (step S13). Since the value of the first count variable nx is "4" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(4) of the amount of X-axis shift dx is 1.9 (mm), and the previous value dx(3) of the amount of X-axis shift dx is 2.4 (mm). In this case, since the current value dx(4) of the amount of X-axis shift dx is smaller than the previous value dx(3) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the > direction toward the negative end thereof (step S17).

The process of step S17 moves the first image 100A from the fifth position to a twentieth position separate therefrom by 0.5 (mm) toward the negative end of the X direction. That is, the process of step S17 is in other words the process in which the first processing apparatus 70A moves the first image 100A from the fifth position to the twentieth position separate therefrom by 0.5 (mm) toward the negative end of the X direction.

The process described above is the end of the fourth pixel shift correction.

4-5. Fifth Pixel Shift Correction (Ct=5)

Upon the start of the fifth pixel shift correction, the first processing apparatus 70A first acquires a captured image of the projection surface 200 from the camera 80 (step S1). More specifically, in step S1 of the fifth pixel shift correction, the first processing apparatus 70A acquires a captured image from the camera 80 by causing the camera 80 to capture an image of the projection surface 200 with the first image 100A projected by the first projector 10A at the twentieth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the fifth pixel shift correction provides 1.4 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "5" at this point.

The first processing apparatus 70A subsequently links the amount of X-axis shift dx temporarily saved in the first memory 60A with the value of the first count variable nx and saves the result in the first memory 60A (step S12). That is, 1.4 (mm), which is the value of the amount of X-axis shift dx, is linked with "5", which is the value of the first count variable nx, and saved in the first memory 60A.

The first processing apparatus 70A subsequently evaluates whether the value of the first count variable nx is "1" (step S13). Since the value of the first count variable nx is "5" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(5) of the amount of X-axis shift dx is 1.4 (mm), and the previous value dx(4) of the amount of X-axis shift dx is 1.9 (mm). In this case, since the current value dx(5) of the amount of X-axis shift dx is smaller than the previous value dx(4) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the twentieth position to a twenty-first position separate therefrom by 0.5 (mm) toward the negative end of the X direction. That is, the process of step S17 is in other words the process in which the first processing apparatus 70A moves the first image 100A from the twentieth position to the twenty-first position separate therefrom by 0.5 (mm) toward the negative end of the X direction.

The process described above is the end of the fifth pixel shift correction.

4-6. Sixth Pixel Shift Correction (Ct=6)

Upon the start of the sixth pixel shift correction, the first processing apparatus 70A first acquires a captured image of the projection surface 200 from the camera 80 (step S1). More specifically, in step S1 of the sixth pixel shift correction, the first processing apparatus 70A acquires a captured image from the camera 80 by causing the camera 80 to capture an image of the projection surface 200 with the first image 100A projected by the first projector 10A at the twenty-first position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the sixth pixel shift correction provides 0.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is smaller than the amount of Y-axis shift dy(No in step S4), and performs the Y-axis correction (step S6).

Upon the start of the Y-axis correction, the first processing apparatus 70A first increments the value of the second count variable ny (step S21). The value of the second count variable ny is "1" at this point.

The first processing apparatus 70A subsequently links the amount of Y-axis shift dy temporarily saved in the first memory 60A with the value of the second count variable ny and saves the result in the first memory 60A (step S22). That is, 1.3 (mm), which is the value of the amount of Y-axis shift dy, is linked with "1", which is the value of the second count variable ny, and saved in the first memory 60A.

The first processing apparatus 70A subsequently evaluates whether the value of the second count variable ny is "1" (step S23). Since the value of the second count variable ny is "1" at this point, the first processing apparatus 70A determines that the value of the second count variable ny is "1" (Yes in step S23), and transitions to step S24.

Upon the transition to step S24, the first processing apparatus 70A moves the first image 100A by 0.5 (mm) toward the positive end of Y direction (step S24). The process of step S24 moves the first image 100A from twenty-first position to a twenty-second position separate therefrom by 0.5 (mm) toward the positive end of the Y direction. That is, the process of step S24 is in other words the process in which the first processing apparatus 70A moves the first image 100A from the twenty-first position to the twenty-second position separate therefrom by 0.5 (mm) toward the positive end of the Y direction.

The process described above is the end of the sixth pixel shift correction.

4-7. Seventh Pixel Shift Correction (Ct=7)

Upon the start of the seventh pixel shift correction, the first processing apparatus 70A first acquires a captured image of the projection surface 200 from the camera 80 (step S1). More specifically, in step S1 of the seventh pixel shift correction, the first processing apparatus 70A acquires a captured image from the camera 80 by causing the camera 80 to capture an image of the projection surface 200 with the first image 100A projected by the first projector 10A at the twenty-second position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). It is assumed that step S2 of the seventh pixel shift correction provides 0.9 (mm) as the amount of X-axis shift dx and 1.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is smaller than the amount of Y-axis shift dy(No in step S4), and performs the Y-axis correction (step S6).

Upon the start of the Y-axis correction, the first processing apparatus 70A first increments the value of the second count variable ny (step S21). The value of the second count variable ny is "2" at this point.

The first processing apparatus 70A subsequently links the amount of Y-axis shift dy temporarily saved in the first memory 60A with the value of the second count variable ny and saves the result in the first memory 60A (step S22). That is, 1.8 (mm), which is the value of the amount of Y-axis shift dy, is linked with "2", which is the value of the second count variable ny, and saved in the first memory 60A.

The first processing apparatus 70A subsequently evaluates whether the value of the second count variable ny is "1" (step S23). Since the value of the second count variable ny is "2" at this point, the first processing apparatus 70A determines that the value of the second count variable ny is not "1" (No in step S23), and transitions to step 25.

Upon the transition to step S25, the first processing apparatus 70A evaluates whether Conditional Expression (2) described above is satisfied (step S25). At this point, the current value dy(2) of the amount of Y-axis shift dy is 1.8 (mm), and the previous value dy(1) of the amount of Y-axis shift dy is 1.3 (mm). In this case, since the current value dy(2) of the amount of Y-axis shift dy is greater than the previous value dy(1) of the amount of Y-axis shift dy, Conditional Expression (2) is satisfied. The first processing apparatus 70A therefore determines that Conditional Expression (2) is satisfied (Yes in step S25), and transitions to step S26.

Upon the transition to step S26, the first processing apparatus 70A moves the first image 100A by 0.5 (mm) in the opposite direction of the previous shift direction, that is, in the Y direction toward the negative end thereof (step S26).

The process of step S26 moves the first image 100A from the twenty-second position to a twenty-third position separate therefrom by 0.5 (mm) toward the negative end of the Y direction. That is, the process of step S26 is in other words the process in which the first processing apparatus 70A moves the first image 100A from the twenty-second position to the twenty-third position separate therefrom by 0.5 (mm) toward the negative end of the Y direction. The position separate from the twenty-first position by 0.5 (mm) toward the positive end of the Y direction is the twenty-second position, and the position separate from the twenty-second position by 0.5 (mm) toward the negative end of the Y direction is the twenty-third position. As a result, the twenty-third position coincides with the twenty-first position.

The process described above is the end of the seventh pixel shift correction.

4-8. Eighth Pixel Shift Correction (Ct=8)

Upon the start of the eighth pixel shift correction, the first processing apparatus 70A first acquires a captured image of the projection surface 200 from the camera 80 (step S1). More specifically, in step S1 of the eighth pixel shift correction, the first processing apparatus 70A acquires a captured image from the camera 80 by causing the camera 80 to capture an image of the projection surface 200 with the first image 100A projected by the first projector 10A at the twenty-third position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the eighth pixel shift correction provides 0.9 (mm) as the amount of X-axis shift dx and 1.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is smaller than the amount of Y-axis shift dy(No in step S4), and performs the Y-axis correction (step S6).

Upon the start of the Y-axis correction, the first processing apparatus 70A first increments the value of the second count variable ny (step S21). The value of the second count variable ny is "3" at this point.

The first processing apparatus 70A subsequently links the amount of Y-axis shift dy temporarily saved in the first memory 60A with the value of the second count variable ny and saves the result in the first memory 60A (step S22). That is, 1.3 (mm), which is the value of the amount of Y-axis shift dy, is linked with "3", which is the value of the second count variable ny, and saved in the first memory 60A.

The first processing apparatus 70A subsequently evaluates whether the value of the second count variable ny is "1" (step S23). Since the value of the second count variable ny is "3" at this point, the first processing apparatus 70A determines that the value of the second count variable ny is not "1" (No in step S23), and transitions to step 25.

Upon the transition to step S25, the first processing apparatus 70A evaluates whether Conditional Expression (2) described above is satisfied (step S25). At this point, the current value dy(3) of the amount of Y-axis shift dy is 1.3 (mm), and the previous value dy(2) of the amount of Y-axis shift dy is 1.8 (mm). In this case, since the current value dy(3) of the amount of Y-axis shift dy is smaller than the previous value dy(2) of the amount of Y-axis shift dy, Conditional Expression (2) is not satisfied. The first processing apparatus 70A therefore determines that Conditional Expression (2) is not satisfied (No in step S25), and transitions to step S27.

Upon the transition to step S27, the first processing apparatus 70A moves the first image 100A by 0.5 (mm) in the same direction as the previous shift direction, that is, in the Y direction toward the negative end thereof (step S27).

The process of step S27 moves the first image 100A from the twenty-third position to a twenty-fourth position separate therefrom by 0.5 (mm) toward the negative end of the Y direction. That is, the process of step S27 is in other words the process in which the first processing apparatus 70A moves the first image 100A from the twenty-third position to the twenty-fourth position separate therefrom by 0.5 (mm) toward the negative end of the Y direction.

The process described above is the end of the eighth pixel shift correction.

4-9. Ninth Pixel Shift Correction (Ct=9)

Upon the start of the ninth pixel shift correction, the first processing apparatus 70A first acquires a captured image of the projection surface 200 from the camera 80 (step S1). More specifically, in step S1 of the ninth pixel shift correction, the first processing apparatus 70A acquires a captured image from the camera 80 by causing the camera 80 to capture an image of the projection surface 200 with the first image 100A projected by the first projector 10A at the twenty-fourth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the ninth pixel shift correction provides 0.9 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of X-axis shift dx and the amount of Y-axis shift dy are both greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is greater than the amount of Y-axis shift dy (Yes in step S4), and performs the X-axis correction (step S5).

Upon the start of the X-axis correction, the first processing apparatus 70A first increments the value of the first count variable nx (step S11). The value of the first count variable nx is "6" at this point.

The first processing apparatus 70A subsequently links the amount of X-axis shift dx temporarily saved in the first memory 60A with the value of the first count variable nx and saves the result in the first memory 60A (step S12). That is, 0.9 (mm), which is the value of the amount of X-axis shift dx, is linked with "6", which is the value of the first count variable nx, and saved in the first memory 60A.

The first processing apparatus 70A subsequently evaluates whether the value of the first count variable nx is "1"

(step S13). Since the value of the first count variable nx is "6" at this point, the first processing apparatus 70A determines that the value of the first count variable nx is not "1" (No in step S13), and transitions to step S15.

Upon the transition to step S15, the first processing apparatus 70A evaluates whether Conditional Expression (1) described above is satisfied (step S15). At this point, the current value dx(6) of the amount of X-axis shift dx is 0.9 (mm), and the previous value dx(5) of the amount of X-axis shift dx is 1.4 (mm). In this case, since the current value dx(6) of the amount of X-axis shift dx is smaller than the previous value dx(5) of the amount of X-axis shift dx, Conditional Expression (1) is not satisfied. The first processing apparatus 70A therefore determines that Conditional Expression (1) is not satisfied (No in step S15), and transitions to step S17.

Upon the transition to step S17, the first processing apparatus 70A moves the first image 100A by 0.5 (mm) in the same direction as the previous shift direction, that is, in the X direction toward the negative end thereof (step S17).

The process of step S17 moves the first image 100A from the twenty-fourth position to a twenty-fifth position separate therefrom by 0.5 (mm) toward the negative end of the X direction. That is, the process of step S17 is in other words the process in which the first processing apparatus 70A moves the first image 100A from the twenty-fourth position to the twenty-fifth position separate therefrom by 0.5 (mm) toward the negative end of the X direction.

The process described above is the end of the ninth pixel shift correction.

4-10. Tenth Pixel Shift Correction (Ct=10)

Upon the start of the tenth pixel shift correction, the first processing apparatus 70A first acquires a captured image of the projection surface 200 from the camera 80 (step S1). More specifically, in step S1 of the tenth pixel shift correction, the first processing apparatus 70A acquires a captured image from the camera 80 by causing the camera 80 to capture an image of the projection surface 200 with the first image 100A projected by the first projector 10A at the twenty-fifth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the tenth pixel shift correction provides 0.4 (mm) as the amount of X-axis shift dx and 0.8 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The first processing apparatus 70A determines that the amount of Y-axis shift dy is greater than the threshold Th (Yes in step S3), and transitions to step S4.

Upon the transition to step S4, the first processing apparatus 70A evaluates whether the amount of X-axis shift dx is greater than the amount of Y-axis shift dy(step S4). The first processing apparatus 70A determines that the amount of X-axis shift dx is smaller than the amount of Y-axis shift dy(No in step S4), and performs the Y-axis correction (step S6).

Upon the start of the Y-axis correction, the first processing apparatus 70A first increments the value of the second count variable ny (step S21). The value of the second count variable ny is "4" at this point.

The first processing apparatus 70A subsequently links the amount of Y-axis shift dy temporarily saved in the first memory 60A with the value of the second count variable ny and saves the result in the first memory 60A (step S22). That is, 0.8 (mm), which is the value of the amount of Y-axis shift dy, is linked with "4", which is the value of the second count variable ny, and saved in the first memory 60A.

The first processing apparatus 70A subsequently evaluates whether the value of the second count variable ny is "1" (step S23). Since the value of the second count variable ny is "4" at this point, the first processing apparatus 70A determines that the value of the second count variable ny is not "1" (No in step S23), and transitions to step S25.

Upon the transition to step S25, the first processing apparatus 70A evaluates whether Conditional Expression (2) described above is satisfied (step S25). At this point, the current value dy(4) of the amount of Y-axis shift dy is 0.8 (mm), and the previous value dy(3) of the amount of Y-axis shift dy is 1.3 (mm). In this case, since the current value dy(4) of the amount of Y-axis shift dy is smaller than the previous value dy(3) of the amount of Y-axis shift dy, Conditional Expression (2) is not satisfied. The first processing apparatus 70A therefore determines that Conditional Expression (2) is not satisfied (No in step S25), and transitions to step S27.

Upon the transition to step S27, the first processing apparatus 70A moves the first image 100A by 0.5 (mm) in the same direction as the previous shift direction, that is, in the Y direction toward the negative end thereof (step S27).

The process of step S27 moves the first image 100A from the twenty-fifth position to a twenty-sixth position separate therefrom by 0.5 (mm) toward the negative end of the Y direction. That is, the process of step S27 is in other words the process in which the first processing apparatus 70A moves the first image 100A from the twenty-fifth position to the twenty-sixth position separate therefrom by 0.5 (mm) toward the negative end of the Y direction.

The process described above is the end of the tenth pixel shift correction.

4-11. Eleventh Pixel Shift Correction (Ct=11)

Upon the start of the eleventh pixel shift correction, the first processing apparatus 70A first acquires a captured image of the projection surface 200 from the camera 80 (step S1). More specifically, in step S1 of the eleventh pixel shift correction, the first processing apparatus 70A acquires a captured image from the camera 80 by causing the camera 80 to capture an image of the projection surface 200 with the first image 100A projected by the first projector 10A at the twenty-sixth position on the projection surface 200 and the second image 100B projected by the second projector 10B at the second position on the projection surface 200.

The first processing apparatus 70A subsequently calculates the amount of X-axis shift dx and the amount of Y-axis shift dy in the overlapping region 110 based on the captured image (step S2). Step S2 of the eleventh pixel shift correction provides 0.4 (mm) as the amount of X-axis shift dx and 0.3 (mm) as the amount of Y-axis shift dy. The first processing apparatus 70A temporarily saves the amount of X-axis shift dx and the amount of Y-axis shift dy in the first memory 60A.

The first processing apparatus 70A subsequently evaluates whether the amount of X-axis shift dx or the amount of Y-axis shift dy is greater than the threshold Th (step S3). The amount of X-axis shift dx and the amount of Y-axis shift dy produced in step S2 of the eleventh pixel shift correction are both smaller than the threshold Th. The first processing apparatus 70A therefore determines that the amount of X-axis shift dx and the amount of Y-axis shift dy are both smaller than the threshold Th (No in step S3), deletes the amount of X-axis shift dx and the amount of Y-axis shift dy temporarily saved in the first memory 60A, and then terminates the eleventh pixel shift correction.

The fourth action example has been described. As described above, in the fourth action example, in the period for which the pixel shift correction is performed eleven times, the X-axis correction is performed when the amount of X-axis shift dx is greater than the amount of Y-axis shift dy, and the Y-axis correction is performed when the amount of X-axis shift dx is smaller than the amount of Y-axis shift dy. In the thus configured present embodiment, alternately performing the X-axis correction and the Y-axis correction until the amount of X-axis shift dx and the amount of Y-axis shift dy are both smaller the Th than threshold allows early convergence of each of the amount of X-axis shift dx and the amount of Y-axis shift dy to a value smaller than the threshold Th.

Effects of First Embodiment

As described above, the projection image adjustment method according to the present embodiment includes acquiring the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquiring, based on the first captured image, the amount of X-axis shift dx along the X-axis between the first image 100A and the second image 100B, that is, the first amount of shift, and the amount of Y-axis shift dy along the Y-axis between the first image 100A and the second image 100B, that is, the second amount of shift, causing the first projector 10A to move the first image 100A from the first position to the third position separate therefrom by the unit amount of displacement toward the positive end of the X direction when the first and second amounts of shift satisfy the first condition, acquiring the second captured image from the camera 80 by causing the camera 80 to capture an image of the projection surface 200 with the first image 100A projected by the first projector 10A at the third position and the second image 100B projected by the second projector 10B at the second position, acquiring, based on the second captured image, the amount of X-axis shift dx along the X-axis between the first image 100A and the second image 100B, that is, the third amount of shift, and the amount of Y-axis shift dy along the Y-axis between the first image 100A and the second image 100B, that is, the fourth amount of shift, and causing the first projector 10A to move the first image 100A from the third position to the fourth position separate therefrom by the unit amount of displacement toward the negative end of the X direction when the third and fourth amounts of shift satisfy the second condition and the third amount of shift is greater than the first amount of shift.

When the third amount of shift is greater than the first amount of shift, it is speculated that the X direction toward the positive end thereof, in which the first image 100A was moved for the first time, is the direction in which the amount of X-axis shift dx increases. Therefore, in this case, moving the first image 100A from the third position to the fourth position separate therefrom by the unit amount of displacement in the X direction toward the negative end thereof, which is the opposite direction of the X direction toward the positive end thereof, can correct the wrong shift direction early and reduce the amount of X-axis shift dx. As described above, the present embodiment allows correction of the pixel shift between the first image 100A and the second image 100B only with the aid of the known amount and direction of the relative pixel shift between the first image 100A and the second image 100B, which are projected to overlap with each other.

The projection image adjustment method according to the present embodiment further includes acquiring the third captured image from the camera 80 by causing the camera 80 to capture an image of the projection surface 200 with the first image 100A projected by the first projector 10A at the fourth position and the second image 100B projected by the second projector 10B at the second position, acquiring, based on the third captured image, the amount of X-axis shift dx along the X-axis between the first image 100A and the second image 100B, that is, the fifth amount of shift, and the amount of Y-axis shift dy along the Y-axis between the first image 100A and the second image 100B, that is, the sixth amount of shift, and causing the first projector 10A to move the first image 100A from the fourth position to the fifth position separate therefrom by the unit amount of displacement toward the negative end of the X direction when the fifth and sixth amounts of shift satisfy the third condition and the fifth amount of shift is smaller than the third amount of shift.

When the fifth amount of shift is smaller than the third amount of shift, it is speculated that moving the first: image 100A from the third position to the fourth position separate therefrom by the unit amount of displacement toward the negative end of the X direction corrects the wrong shift direction and reduces the amount of X-axis shift dx. Therefore, in this case, moving the second image 100B from the fourth position to the fifth position separate therefrom by the unit amount of displacement toward the negative end of the X direction can further reduce the amount of X-axis shift dx.

The projection image adjustment method according to the present embodiment further includes causing the first projector 10A to move the first image 100A from the third position to the sixth position separate therefrom by the unit amount of displacement toward the positive end of the X direction when the third and fourth amounts of shift satisfy the second condition and the third amount of shift is smaller than the first amount of shift.

When the third amount of shift is smaller than the first amount of shift, it is speculated that the X direction toward the positive end thereof, in which the first image 100A was moved for the first time, is the direction in which the amount of X-axis shift dx decreases. Therefore, in this case, moving the first image 100A from the third position to the sixth position separate therefrom by the unit amount of displacement toward the positive end of the X direction can further reduce the amount of X-axis shift dx.

The projection image adjustment method according to the present embodiment further includes causing the first projector 10A to move the first image 100A from the first position to the seventh position separate therefrom by the unit amount of displacement toward the positive end of the Y direction when the first and second amounts of shift do not satisfy the first condition.

As described above, when the first and second amounts of shift satisfy the first condition, the first image 100A is moved toward the positive end of the X direction, whereas when the first and second amounts of shift do not satisfy the first condition, the first image 100A is moved toward the positive end of the Y direction. Changing the direction in which the first image 100A is moved in accordance with whether the first condition is satisfied or not as described above allows the correction to be so performed that the amount of pixel shift recognized by the user decreases.

In the projection image adjustment method according to the present embodiment, the first condition is a condition that the first amount of shift is greater than the second amount of shift. That is, the first condition is a condition that the amount of X-axis shift dx acquired based on the first captured image is greater than the amount of Y-axis shift dy acquired based on the first captured image. Furthermore, in the projection image adjustment method according to the present embodiment, the second condition is a condition that the third amount of shift is greater than the fourth amount of shift. That is, the second condition is a condition that the amount of X-axis shift dx acquired based on the second captured image is greater than the amount of Y-axis shift dy acquired based on the second captured image.

According to the present embodiment, when the first amount of shift is greater than the second amount of shift, the first image 100A is moved from the first position to the third position separate therefrom by the unit amount of displacement toward the positive end of the X direction, and when the third amount of shift is greater than the fourth amount of shift, the first image 100A is moved from the third position to the fourth position separate therefrom by the unit amount of displacement toward the negative end of the X direction. As described above, adjusting the position of the first image 100A with priority given to the direction of an axis along which the amount of pixel shift is greater allows correction of the visually larger pixel shift in a shorter period.

In the projection image adjustment method according to the present embodiment, the position of the first image 100A projected onto the projection surface 200 changes in accordance with the position of the first projection lens 23A provided in the first projector 10A, and causing the first projector 10A to move the first image 100A from the first position to the third position includes changing the position of the first projection lens 23A to move the first image 100A from the first position to the third position.

As described above, the first image 100A can be moved by changing the position of the first projection lens 23A. The method for changing the position at which the first panel image is displayed in the display region of the first liquid crystal panel 22A, which will be described below, is suitable for moving the first image 100A on a full-pixel basis, whereas the method for changing the position of the first projection lens 23A is suitable for moving the first image 100A on a sub-pixel basis.

In the projection image adjustment method according to the present embodiment, the first image 100A corresponds to the first panel image displayed in the display region of the first liquid crystal panel 22A provided in the first projector 10A, and causing the first projector 10A to move the first image 100A from the first position to the third position includes changing the position where the first panel image is displayed in the display region of the first liquid crystal panel 22A to move the first image 100A from the first position to the third position.

As described above, changing the position where the first panel image is displayed in the display region of the first liquid crystal panel 22A can move the first image 100A even when the first projector 10A does not have the function of adjusting the position of the first projection lens 23A.

The projection system 1 according to the present embodiment includes the first projector 10A, which projects the first image 100A onto the projection surface 200, the second projector 10B, which projects the second image 100B onto the projection surface 200, and the camera 80, which captures an image of the projection surface 200, first the projector 10A includes the processing apparatus 70, which acquires the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquires, based on the first captured image, the amount of X-axis shift dx along the X-axis between the first image 100A and the second image 100B, that is, the first amount of shift, and the amount of Y-axis shift dy along the Y-axis between the first image 100A and the second image 100B, that is, the second amount of shift, causes the first projector 10A to move the first image 100A from the first position to the third position separate therefrom by the unit amount of displacement toward the positive end of the X direction when the first and second amounts of shift satisfy the first condition, acquires the second captured image from the camera 80 by causing the camera 80 to capture an image of the projection surface 200 with the first image 100A projected by the first projector 10A at the third position and the second image 100B projected by the second projector 10B at the second position, acquires, based on the second captured image, the amount of X-axis shift dx along the X-axis between the first image 100A and the second image 100B, that is, the third amount of shift, and the amount of Y-axis shift dy along the Y-axis between the first image 100A and the second image 100B, that is, the fourth amount of shift, and causes the first projector 10A to move the first image 100A from the third position to the fourth position separate therefrom by the unit amount of displacement toward the negative end of the X direction when the third and fourth amounts of shift satisfy the second condition and the third amount of shift is greater than the first amount of shift.

The projection system 1 according to the present embodiment can correct the pixel shift between the first image 100A and the second image 100B only with the aid of the known amount and direction of the relative pixel shift between the first image 100A and the second image 100B, which are projected to overlap with each other.

The non-transitory computer-readable storage medium storing a program according to the present embodiment causes a computer to acquire the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquire, based on the first captured image, the amount of X-axis shift dx along the X-axis between the first image 100A and the second image 100B, that is, the first amount of shift, and the amount of Y-axis shift dy along the Y-axis between the first image 100A and the second image 100B, that is, the second amount of shift, cause the first projector 10A to move the first image 100A from the first position to the third position separate therefrom by the unit amount of displacement toward the positive end of the X direction when the first and second amounts of shift satisfy the first condition, acquire the second captured image from the camera 80 by causing the camera 80 to capture an image of the projection surface 200 with the first image 100A projected by the first projector 10A at the third position and the second image 100B projected by the second projector 10B at the second position, acquire, based on the second captured image, the amount of X-axis shift dx along the X-axis between the first image 100A and the second image 100B, that is, the third amount of shift, and the amount of Y-axis shift dy along the Y-axis between the first image 100A and the second image 100B, that is, the fourth amount of shift, and cause the first projector 10A to move the first image 100A from the third position to the fourth position separate therefrom by the unit amount of displacement toward the negative end of the X direction when the third and fourth amounts of shift satisfy the second condition and the third amount of shift is greater than the first amount of shift.

The non-transitory computer-readable storage medium storing a program according to the present embodiment can correct the pixel shift between the first image 100A and the second image 100B only with the aid of the known amount and direction of the relative pixel shift between the first image 100A and the second image 100B, which are projected to overlap with each other.

Second Embodiment

Figure 14:
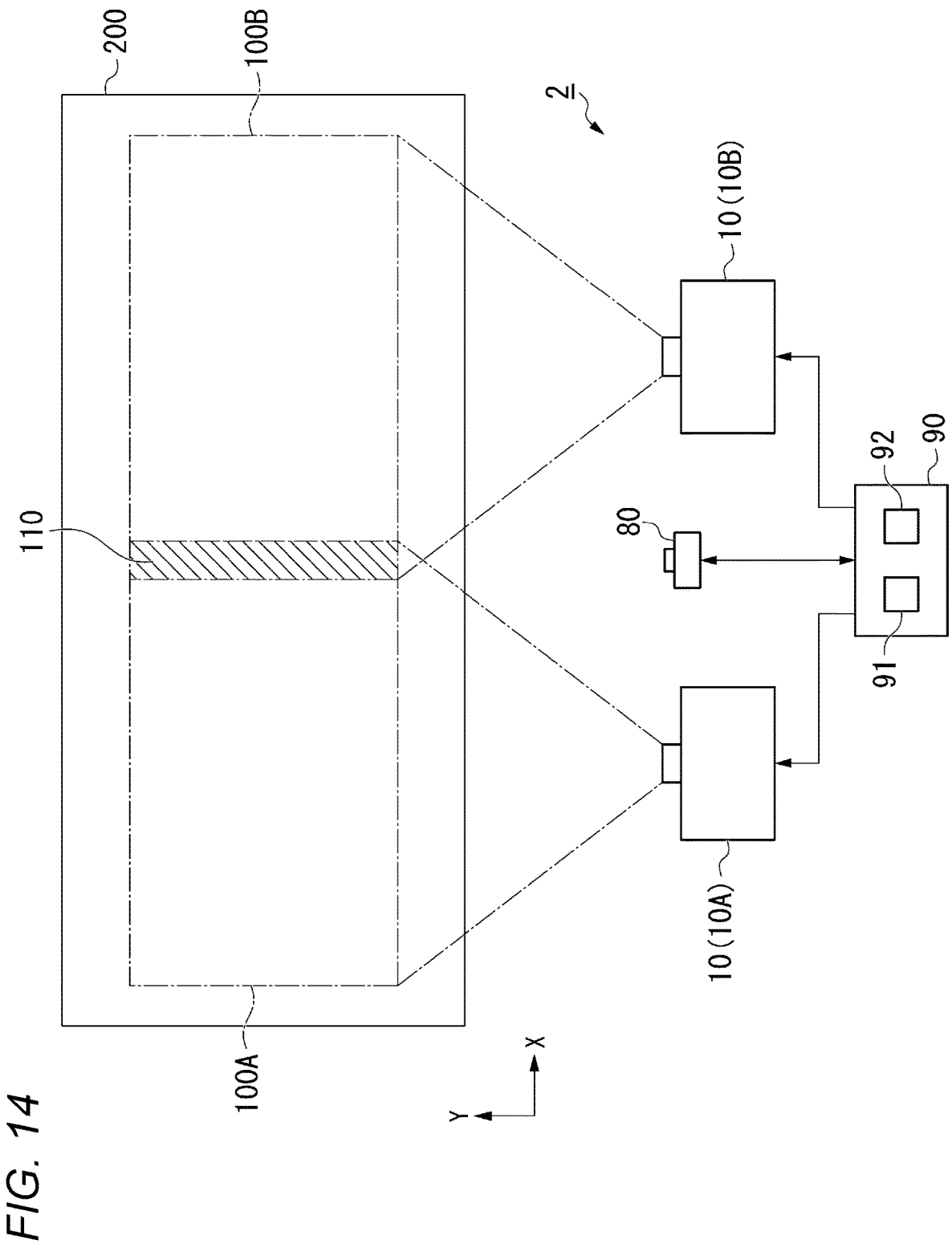
FIG. 14 shows a schematic configuration of the projection system according to a second embodiment.

A second embodiment of the present disclosure will be described below. FIG. 14 shows a schematic configuration of a projection system 2 according to the second embodiment. The projection system 2 is a multi-projection system that displays a single image on the projection surface 200 by tiling a plurality of images projected from the plurality of projectors 10 onto the projection surface 200, as in the first embodiment. In the second embodiment presented below by way of example, the configurations common to those in the first embodiment have the same reference characters used in the first embodiment, and no detailed description of the common configurations will be made as appropriate.

The projection system 2 includes the first projector 10A, the second projector 10B, the camera 80, and an information processing apparatus 90. In the second embodiment, the first projector 10A, the second projector 10B, and the camera 80 each communicate with the information processing apparatus 90 in the form of wired or wireless communication. For example, the information processing apparatus 90 is a personal computer or a tablet terminal.

The information processing apparatus 90 includes at least a processing apparatus 91 and a memory 92. The information processing apparatus 90 includes a built-in circuit board that is not shown, such as a motherboard, and the processing apparatus 91 and the memory 92 are disposed on the circuit board. The circuit board further includes the following components disposed thereon: a connector for external connection that is not shown but is exposed through the enclosure of the information processing apparatus 90; a communication interface circuit that is not shown but is electrically coupled to the connector for external connection; and other components. On the circuit board, the processing apparatus 91, the memory 92, and the communication interface circuit are electrically coupled to each other via a bus or other wiring lines.

The memory 92 includes a nonvolatile memory that stores a program and a variety of setting data necessary for the processing apparatus 91 to carry out a variety of processes, and a volatile memory used as a temporary data saving destination when the processing apparatus 91 carries out the variety of processes. The nonvolatile memory is, for example, an EEPROM, a ROM, or a flash memory. The volatile memory is, for example, a RAM.

The processing apparatus 91 is a processor that carries out the variety of processes in accordance with the program stored in advance in the memory 92. As an example, the processing apparatus 91 is formed of one or more CPUs. Part or entirety of the functions of the processing apparatus 91 may be achieved by a circuit, such as a DSP, an ASIC, a PLD, and an FPGA. The processing apparatus 91 concurrently or successively carries out the variety of processes.

The processing apparatus 91 communicates with the first projector 10A, the second projector 10B, and the camera 80 via the communication interface circuit. The processing apparatus 91 performs the pixel shift correction in accordance with the program stored in advance in the memory 92. The pixel shift correction has been described in the first embodiment, and will therefore not be described in the second embodiment.

Effects of Second Embodiment

The information processing apparatus 90 according to the present embodiment includes the processing apparatus 91, which acquires the first captured image from the camera 80 by causing the camera 80 to capture an image of the projection surface 200 with the first image 100A projected by the first projector 10A at the first position on the projection surface 200 and the second image 100B projected by the second projector 10B at the second position on the projection surface 200 and at least partially overlapping with the first image 100A, acquires, based on the first captured image, the amount of X-axis shift dx along the X-axis between the first image 100A and the second image 100B, that is, the first amount of shift, and the amount of Y-axis shift dy along the Y-axis between the first image 100A and the second image 100B, that is, the second amount of shift, causes the first projector 10A to move the first image 100A from the first position to the third position separate therefrom by the unit amount of displacement toward the positive end of the X direction when the first and second amounts of shift satisfy the first condition, acquires the second captured image from the camera 80 by causing the camera 80 to capture an image of the projection surface 200 with the first image 100A projected by the first projector 10A at the third position and the second image 100B projected by the second projector 10B at the second position, acquires, based on the second captured image, the amount of X-axis shift dx along the X-axis between the first image 100A and the second image 100B, that is, the third amount of shift, and the amount of Y-axis shift dy along the Y-axis between the first image 100A and the second image 100B, that is, the fourth amount of shift, and causes the first projector 10A to move the first image 100A from the third position to the fourth position separate therefrom by the unit amount of displacement toward the negative end of the X direction when the third and fourth amounts of shift satisfy the second condition and the third amount of shift is greater than the first amount of shift.

The information processing apparatus 90 according to the present embodiment can correct the pixel shift between the first image 100A and the second image 100B only with the aid of the known amount and direction of the relative pixel shift between the first image 100A and the second image 100B, which are projected to overlap with each other.

The embodiments of the present disclosure have been described above, but the technical range of the present disclosure is not limited to the embodiments described above, and a variety of changes can be made thereto to the extent that the changes do not depart from the intent of the present disclosure.

The embodiments described above show by way of example the form in which the first condition is a condition that the first amount of shift is greater than the second amount of shift, and the second condition is a condition that the third amount of shift is greater than the fourth amount of shift. The present disclosure is not limited to the form described above, and the first condition may be a condition that the first amount of shift is smaller than the second amount of shift, and the second condition is a condition that the third amount of shift is smaller than the fourth amount of shift. According to the variation described above, when the first amount of shift is smaller than the second amount of shift, the first image 100A is moved from the first position to the third position separate therefrom by the unit amount of displacement toward the positive end of the X direction, and when the third amount of shift is smaller than the fourth amount of shift, the first image 100A is moved from the third position to the fourth position separate therefrom by the unit amount of displacement toward the negative end of the X direction. Adjusting the position of the first image 100A with priority given to the direction of an axis along which the amount of pixel shift is smaller as described above can prevent the user from feeling a visually large pixel shift, for example, when the first image 100A is moved in the direction in which the amount of pixel shift increases.

For example, the aforementioned embodiments have presented by way of example the projection system 1 and 2 each including the two projectors 10, but not necessarily in the present disclosure, and the number of projectors 10 may be two or more.

The projection image adjustment method according to the aforementioned embodiments has been described by way of example with reference to the configuration using the unit amount of displacement, which is set at a value greater than or equal to the lower limit of the amount of pixel shift that can be calculated from the captured image as each of the first, second, third, fourth, and fifth distances, but not necessarily in the present disclosure. The values of the first to fifth distances may differ from each other. For example, the values may each be adjusted in accordance with a produced amount of X-axis shift dx or Y-axis shift dy.

Summary of Present Disclosure

The present disclosure will be summarized below as additional remarks.

Additional Remark 1

A projection image adjustment method including acquiring a first captured image from a camera by causing the camera to capture an image of a projection surface with a first image projected by a first projector at a first position on the projection surface and a second image projected by a second projector at a second position on the projection surface and at least partially overlapping with the first image, acquiring, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causing the first projector to move the first image from the first position to a third position separate therefrom by a first distance in a first direction corresponding to the direction toward one end of the first axis when the first and second amounts of shift satisfy a first condition, acquiring a second captured image from the camera by causing the camera to capture an image of the projection surface with the first image projected by the first projector at the third position and the second image projected by the second projector at the second position, acquiring, based on the second captured image, a third amount of shift along the first axis between the first image and the second image and a fourth amount of shift along the second axis between the first image and the second image, and causing the first projector to move the first image from the third position to a fourth position separate therefrom by a second distance in a second direction that is the opposite direction of the first direction when the third and fourth amounts of shift satisfy a second condition and the third amount of shift is greater than the first amount of shift.

When the third amount of shift is greater than the first amount of shift, it is speculated that the first direction, in which the first image was moved for the first time, is the direction in which the amount of pixel shift along the first axis between the first and second images increases. Therefore, in this case, moving the first image from the third position to the fourth position separate therefrom by the second distance in the second direction, which is the opposite direction of the first direction, can correct the wrong shift direction at an early stage and hence reduce the pixel shift along the first axis. As described above, the projection image adjustment method described in the additional remark 1 can correct the pixel shift between the first image and the second image only with the aid of the known amount and direction of the relative pixel shift between the first image and the second image, which are projected to overlap with each other.

Additional Remark 2

The projection image adjustment method described in the additional remark 1, further including acquiring a third captured image from the camera by causing the camera to capture an image of the projection surface with the first image projected by the first projector at the fourth position and the second image projected by the second projector at the second position, acquiring, based on the third captured image, a fifth amount of shift along the first axis between the first image and the second image and a sixth amount of shift along the second axis between the first image and the second image, and causing the first projector to move the first image from the fourth position to a fifth position separate therefrom by a third distance in the second direction when the fifth and sixth amounts of shift satisfy a third condition and the fifth amount of shift is smaller than the third amount of shift.

When the fifth amount of shift is smaller than the third amount of shift, it is speculated that moving the first image from the third position to the fourth position separate therefrom by the second distance in the second direction corrects the wrong shift direction and reduces the pixel shift along the first axis. Therefore, in this case, moving the first image from the fourth position to the fifth position separate therefrom by the third distance in the second direction can further reduce the pixel shift along the first axis.

Additional Remark 3

The projection image adjustment method described in the additional remark 1, further including causing the first projector to move the first image from the third position to a sixth position separate therefrom by a fourth distance in the first direction when the third and fourth amounts of shift satisfy the second condition and the third amount of shift is smaller than the first amount of shift.

When the third amount of shift is smaller than the first amount of speculated that the first direction, in which the first image was moved for the first time, is the direction in which the pixel shift along the first axis decreases. Therefore, in this case, moving the first image from the third position to the sixth position separate therefrom by the fourth distance in the first direction can further reduce the pixel shift along the first axis.

Additional Remark 4

The projection image adjustment method described in the additional remark 1, further including causing the first projector to move the first image from the first position to a seventh position separate therefrom by a fifth distance in a third direction corresponding to the direction toward the one end of the second axis when the first and second amounts of shift do not satisfy the first condition.

According to the additional remark 4, when the first and second amounts of shift satisfy the first condition, the first image is moved in the first direction, whereas when the first and second amounts of shift do not satisfy the first condition, the first image is moved in the third direction. Changing the direction in which the first image is moved in accordance with whether the first condition is satisfied or not as described above allows the correction to be so performed that the amount of pixel shift recognized by the user decreases.

Additional Remark 5

The projection image adjustment method described in the additional remark 1, in which the first condition is a condition that the first amount of shift is greater than the second amount of shift, and the second condition is a condition that the third amount of shift is greater than the fourth amount of shift.

According to the additional remark 5, when the first amount of shift is greater than the second amount of shift, the first image is moved from the first position to the third position separate therefrom by the first distance in the first direction, and when the third amount of shift is greater than the fourth amount of shift, the first image is moved from the third position to the fourth position separate therefrom by the second distance in the second direction. As described above, adjusting the position of the first image with priority given to the direction of an axis along which the amount of pixel shift is greater allows correction of the visually larger pixel shift in a shorter period.

Additional Remark 6

The projection image adjustment method described in the additional remark 1, in which the first condition is a condition that the first amount of shift is smaller than the second amount of shift, and the second condition is a condition that the third amount of shift is smaller than the fourth amount of shift.

According to the additional remark 6, when the first amount of shift is smaller than the second amount of shift, the first image is moved from the first position to the third position separate therefrom by the first distance in the first direction, and when the third amount of shift is smaller than the fourth amount of shift, the first image is moved from the third position to the fourth position separate therefrom by the second distance in the second direction. Adjusting the position of the first image with priority given to the direction of an axis along which the amount of pixel shift is smaller as described above can prevent the user from feeling a visually large pixel shift, for example, when the first image is moved in the direction in which the amount of pixel shift increases.

Additional Remark 7

The projection image adjustment method described in any one of the additional remarks 1 to 6, in which the position of the first image projected onto the projection surface changes in accordance with the position of a first projection lens provided in the first projector, and causing the first projector to move the first image to the third position includes changing the position of the first projection lens to move the first image from the first position to the third position.

The first image can thus be moved by changing the position of the first projection lens.

Additional Remark 8

The projection image adjustment method described in any one of the additional remarks 1 to 6, in which the first image corresponds to a first panel image displayed in the display region of a first panel provided in the first projector, and causing the first projector to move the first image from the first position to the third position includes changing the position where the first panel image is displayed in the display region of the first panel to move the first image from the first position to the third position.

As described above, changing the position where the first panel image is displayed in the display region of the first panel can move the first image even when the first projector does not have the function of adjusting the position of the first projection lens.

Additional Remark 9

A projection system including a first projector that projects a first image onto a projection surface, a second projector that projects a second image onto the projection surface, and a camera that captures an image of the projection surface, the first projector including a processing apparatus that acquires a first captured image from the camera by causing the camera to capture an image of the projection surface with the first image projected by the first projector at a first position on the projection surface and the second image projected by the second projector at a second position on the projection surface and at least partially overlapping with the first image, acquires, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causes the first projector to move the first image from the first position to a third position separate therefrom by a first distance in a first direction corresponding to the direction toward one end of the first axis when the first and second amounts of shift satisfy a first condition, acquires a second captured image from the camera by causing the camera to capture an image of the projection surface with the first image projected by the first projector at the third position and the second image projected by the second projector at the second position, acquires, based on the second captured image, a third amount of shift along the first axis between the first image and the second image and a fourth amount of shift along the second axis between the first image and the second image, and causes the first projector to move the first image from the third position to a fourth position separate therefrom by a second distance in a second direction that is the opposite direction of the first direction when the third and fourth amounts of shift satisfy a second condition and the third amount of shift is greater than the first amount of shift.

The projection system described in the additional remark 9 can correct the pixel shift between the first image and the second image only with the aid of the known amount and direction of the relative pixel shift between the first image and the second image, which are projected to overlap with each other.

Additional Remark 10

An information processing apparatus including a processing apparatus that acquires a first captured image from a camera by causing the camera to capture an image of a projection surface with a first image projected by a first projector at a first position on the projection surface and a second image projected by a second projector at a second position on the projection surface and at least partially overlapping with the first image, acquires, based on the first captured image, a first amount of shift along a first axis between the first image and the second image, the first axis being a coordinate axis of a global coordinate system, and a second amount of shift along a second axis between the first image and the second image, the second axis being perpendicular to the first axis, causes the first projector to move the first image from the first position to a third position separate therefrom by a first distance in a first direction corresponding to the direction toward one end of the first axis when the first and second amounts of shift satisfy a first condition, acquires a second captured image from the camera by causing the camera to capture an image of the projection surface with the first image projected by the first projector at the third position and the second image projected by the second projector at the second position, acquires, based on the second captured image, a third amount of shift along the first axis between the first image and the second image and a fourth amount of shift along the second axis between the first image and the second image, and causes the first projector to move the first image from the third position to a fourth position separate therefrom by a second distance in a second direction that is the opposite direction of the first direction when the third and fourth amounts of shift satisfy a second condition and the third amount of shift is greater than the first amount of shift.

The information processing apparatus described in the additional remark 10 can correct the pixel shift between the first image and the second image only with the aid of the known amount and direction of the relative pixel shift between the first image and the second image, which are projected to overlap with each other.

Additional Remark 11

A non-transitory computer-readable storage medium storing a program that causes a computer to acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being coordinate axis of a global coordinate system, and a second amount of shift along a second axis between the first image and the second image, the second axis being perpendicular to the first axis, cause the first projector to move the first image from the first position to a third position separate therefrom by a first distance in a first direction corresponding to the direction toward one end of the first axis when the first and second amounts of shift satisfy a first condition, acquire a second captured image from the camera by causing the camera to capture an image of the projection surface with the first image projected by the first projector at the third position and the second image projected by the second projector at the second position, acquire, based on the second captured image, a third amount of shift along the first axis between the first image and the second image and a fourth amount of shift along the second axis between the first image and the second image, and cause the first projector to move the first image from the third position to a fourth position separate therefrom by a second distance in a second direction that is the opposite direction of the first direction when the third and fourth amounts of shift satisfy a second condition and the third amount of shift is greater than the first amount of shift.

The non-transitory computer-readable storage medium storing a program described in the additional remark 11 can correct the pixel shift between the first image and the second image only with the aid of the known amount and direction of the relative pixel shift between the first image and the second image, which are projected to overlap with each other.

What is claimed is:

1. A projection image adjustment method comprising:
    acquiring a first captured image from a camera by causing the camera to capture an image of a projection surface with a first image projected by a first projector at a first position on the projection surface and a second image projected by a second projector at a second position on the projection surface and at least partially overlapping with the first image;
    acquiring, based on the first captured image, a first amount of shift along a first axis between the first image and the second image, the first axis being a coordinate axis of a global coordinate system, and a second amount of shift along a second axis between the first image and the second image, the second axis being perpendicular to the first axis;
    causing the first projector to move the first image from the first position to a third position separate therefrom by a first distance in a first direction corresponding to a direction toward one end of the first axis when the first and second amounts of shift satisfy a first condition;
    acquiring a second captured image from the camera by causing the camera to capture an image of the projection surface with the first image projected by the first projector at the third position and the second image projected by the second projector at the second position;
    acquiring, based on the second captured image, a third amount of shift along the first axis between the first image and the second image and a fourth amount of shift along the second axis between the first image and the second image; and
    causing the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

2. The projection image adjustment method according to claim 1, further comprising:
    acquiring a third captured image from the camera by causing the camera to capture an image of the projection surface with the first image projected by the first projector at the fourth position and the second image projected by the second projector at the second position;

acquiring, based on the third captured image, a fifth amount of shift along the first axis between the first image and the second image and a sixth amount of shift along the second axis between the first image and the second image; and causing the first projector to move the first image from the fourth position to a fifth position separate therefrom by a third distance in the second direction when the fifth and sixth amounts of shift satisfy a third condition and the fifth amount of shift is smaller than the third amount of shift.

3. The projection image adjustment method according to claim 1, comprising the further causing first projector to move the first image from the third position to a sixth position separate therefrom by a fourth distance in the first direction when the third and fourth amounts of shift satisfy the second condition and the third amount of shift is smaller than the first amount of shift.

4. The projection image adjustment method according to claim 1, further comprising causing the first projector to move the first image from the first position to a seventh position separate therefrom by a fifth distance in a third direction corresponding to a direction toward the one end of the second axis when the first and second amounts of shift do not satisfy the first condition.

5. The projection image adjustment method according to claim 1, wherein
the first condition is a condition that the first amount of shift is greater than the second amount of shift, and
the second condition is a condition that the third amount of shift is greater than the fourth amount of shift.

6. The projection image adjustment method according to claim 1, wherein
the first condition is a condition that the first amount of shift is smaller than the second amount of shift, and
the second condition is a condition that the third amount of shift is smaller than the fourth amount of shift.

7. The projection image adjustment method according to claim 1, wherein
a position of the first image projected onto the projection surface changes in accordance with a position of a first projection lens provided the first projector, and
causing the first projector to move the first image to the third position includes changing the position of the first projection lens to move the first image from the first position to the third position.

8. The projection image adjustment method according to claim 1, wherein
the first image corresponds to a first panel image displayed in a display region of a first panel provided in the first projector, and
causing the first projector to move the first image from the first position to the third position includes changing a position where the first panel image is displayed in the display region of the first panel to move the first image from the first position to the third position.

9. An information processing apparatus comprising one or more processors that
acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, and a second amount of shift along a second axis between the first image and the second image, the second axis being perpendicular to the first axis, cause the first projector to move the first image from the first position to a third position separate therefrom by a first distance in a first direction corresponding to a direction toward one end of the first axis when the first and second amounts of shift satisfy a first condition, acquire a second captured image from the camera by causing the camera to capture an image of the projection surface with the first t image projected by the first projector at the position and the second image projected by the second projector at the second position, acquire, based on the second captured image, a third amount of shift along the first axis between the first image and the second image and a fourth amount of shift along the second axis between the first image and the second image, and cause the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

10. A non-transitory computer-readable storage medium storing a program that causes a computer to
acquire a first captured image from a camera by causing the camera to capture an image of a projection surface with a first image projected by a first projector at a first position on the projection surface and a second image projected by a second projector at a second position on the projection surface and at least partially overlapping with the first image, acquire, based on the first captured image, a first amount of shift along a first axis between the first image and the second image, the first axis being a coordinate axis of a global coordinate system, and a second amount of shift along a second axis between the first image and the second image, the second axis being perpendicular to the first axis, cause the first projector to move the first image from the first position to a third position separate therefrom by a first distance in a first direction corresponding to a direction toward one end of the first axis when the first and second amounts of shift satisfy a first condition, acquire a second captured image from the camera by causing the camera to capture an image of the projection surface with the first image projected by the first projector at the third position and the second image projected by the second projector at the second position, acquire, based on the second captured image, a third amount of shift along the first axis between the first image and the second image and a fourth amount of shift along the second axis between the first image and the second image, and cause the first projector to move the first image from the third position to a fourth position separate therefrom by a second distance in a second direction that is an opposite direction of the first direction when the third and fourth amounts of shift satisfy a second condition and the third amount of shift is greater than the first amount of shift.

* * * * *